(12) United States Patent
Wada et al.

(10) Patent No.: US 6,466,370 B2
(45) Date of Patent: Oct. 15, 2002

(54) IMAGE SHAKE PREVENTING MECHANISM AND OPTICAL DEVICE PROVIDED WITH THE MECHANISM

(75) Inventors: Shigeru Wada, Kishiwada; Junichi Tanii, Izumi, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/956,254

(22) Filed: Sep. 20, 2001

(65) Prior Publication Data
US 2002/0037165 A1 Mar. 28, 2002

(30) Foreign Application Priority Data
Sep. 22, 2000 (JP) .......................................... 2000-288723

(51) Int. Cl.$^7$ ............................................... G02B 27/64
(52) U.S. Cl. ....................... 359/554; 359/555; 359/556; 359/557; 359/407; 359/408
(58) Field of Search .................................. 359/554, 555, 359/556, 557, 407, 408; 396/52, 55

(56) References Cited

FOREIGN PATENT DOCUMENTS

JP          11-344739         12/1999

*Primary Examiner*—Mohammad Sikder
(74) *Attorney, Agent, or Firm*—McDermott, Will & Emery

(57) ABSTRACT

An image deviation correcting device and an optical apparatus having such a device. The device includes: a driven part to be driven so as to correct an image deviation; a holder for holding the driven part; a first linkage arranged perpendicular to the optical axis of the driven part, the first linkage having four arms connected in a parallelogram, one of the arms being secured to the holder; a middle part secured to opposite arm thereof; a second linkage overlapped with the first linkage in parallel relation thereto, the second linkage having four arms connected in a parallelogram, one of the arms being secured to the middle part; and a base part secured to opposite arm thereof. The one of the arms of the first linkage is generally perpendicular to the one of the arms of the second linkage.

24 Claims, 19 Drawing Sheets

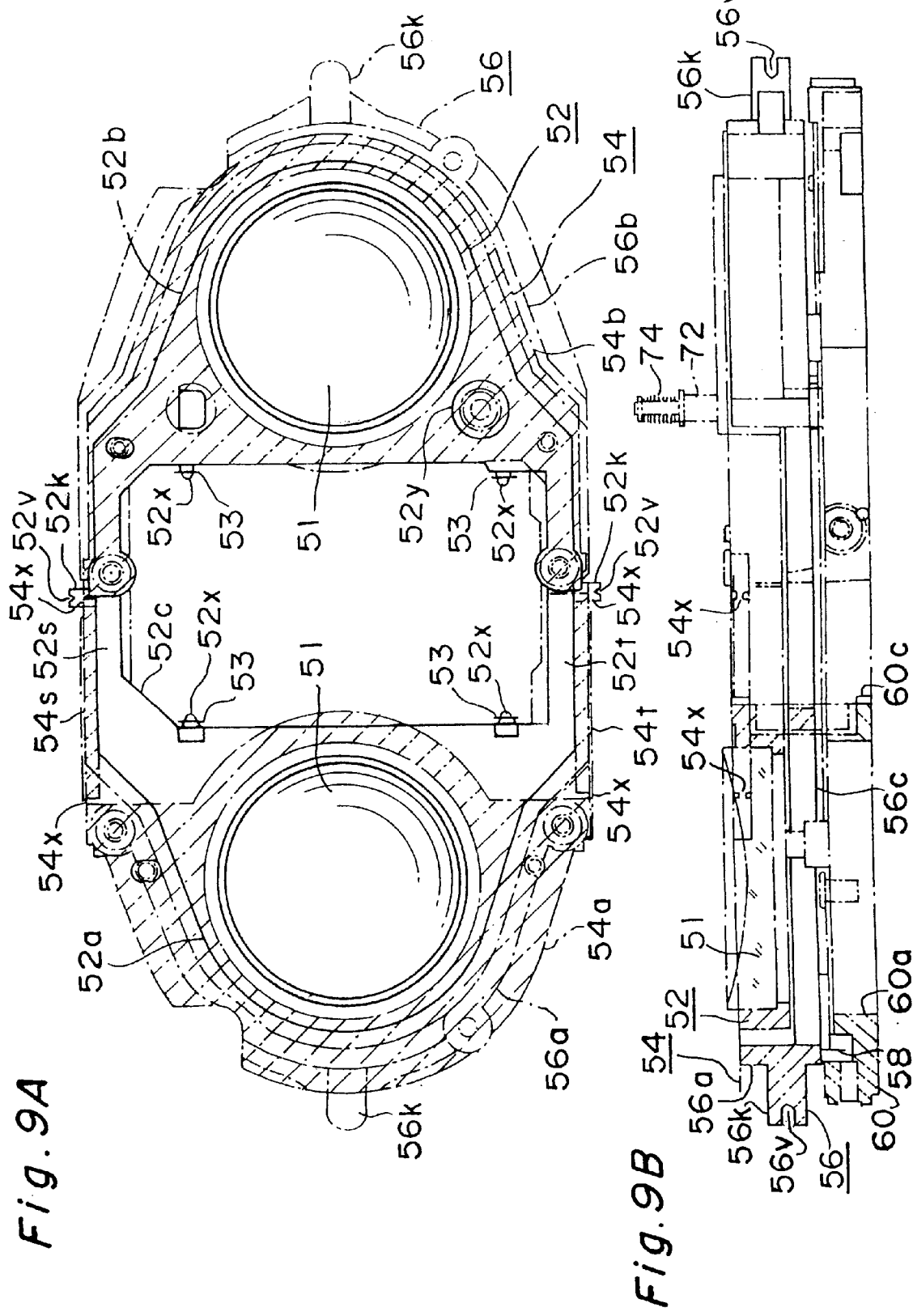

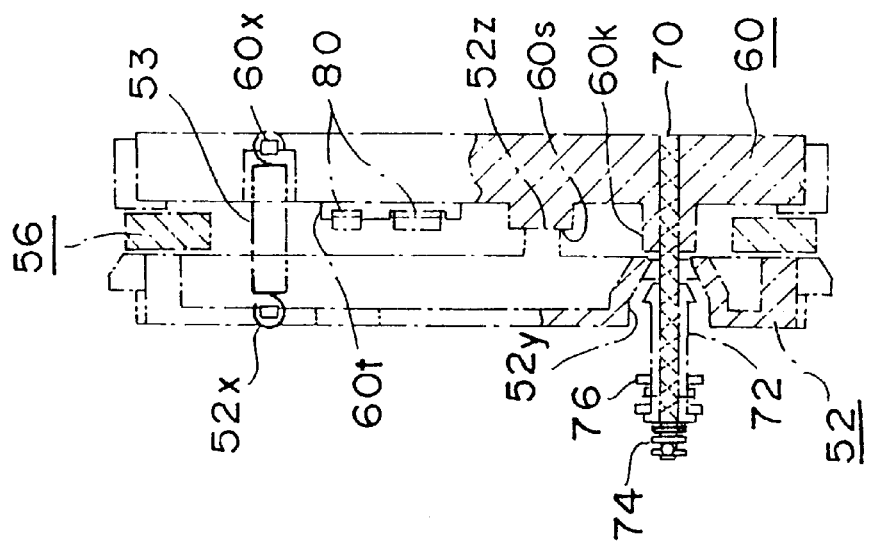
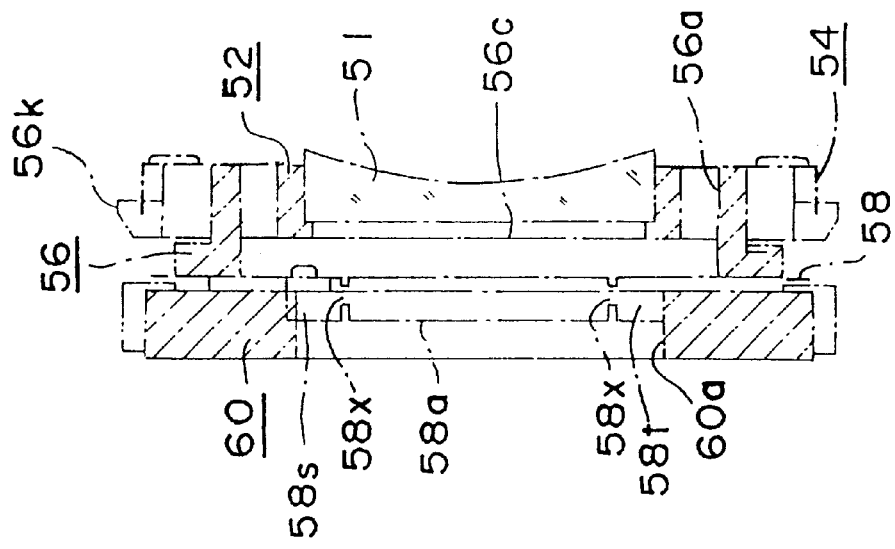
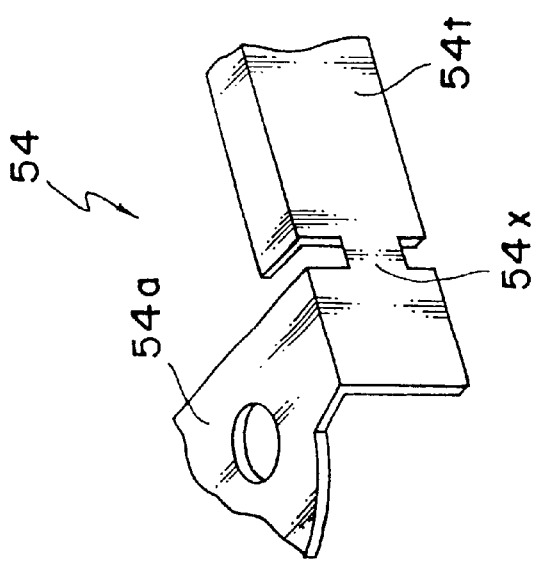

IMAGE SHAKE PREVENTING MECHANISM AND OPTICAL DEVICE PROVIDED WITH THE MECHANISM

This application is based upon application No. 2000-288723 filed in Japan, the contents of which are hereby incorporated by reference.

BACKGROUND OF THE INVENTION

1. Field of the Invention

The present invention relates to an image shake preventing mechanism and an optical device provided with the mechanism. More specifically, the present invention relates to the mechanism for preventing an image shake, or for correcting or compensating a deviation of an image-forming position, which is caused by shaking or moving of a body provided with the mechanism, and relates to the optical device, for example, a pair of binocular, a camera, and so on, provided with the mechanism.

2. Description of the Related Art

Conventionally, there have been proposed some mechanisms for preventing an image shake of an optical device. For example, the mechanisms, in which a correcting or compensating optical system is driven, are classified into a type with an apex angle changeable prism, and another type with a translation lens. Regarding most of the mechanisms belonging to the latter type, the lens is driven by means of thrust drive using an oscillating coil, or lever drive using a motor.

In the thrust drive, friction against a guide rod increases necessarily, and it acts as a load with respect to servo control. In the lever drive, although frictional load decreases, reversing the drive direction causes delay due to some play of lever connecting portions, and it acts as a load with respect to servo control.

With any kinds of drive souses, lighter mass of a driven body makes response faster and resonance frequency higher, and thereby makes servo control easier. However, in conventional mechanisms for preventing an image shake, the holding mechanism for movably holding the correcting or compensating lens tends to become large.

Especially, binoculars provided with the mechanism for preventing an image shake, necessarily become large, because a pair of correcting or compensating optical systems must be driven synchronously.

SUMMARY OF THE INVENTION

Accordingly, it is an object of the present invention to provide an image shake preventing mechanism for preventing an image shake, the volume and mass of which are minimized.

It is another object of the present invention to provide an optical device for preventing an image shake, which volume and mass are minimized.

In order to achieve the above objects, according to one aspect of the present invention, there is provided an image shake preventing mechanism, comprising: a driven member to be driven so as to prevent the image shake; a holding member for holding the driven member; a first parallel linkage member arranged perpendicular to an optical axis of the driven member, the first parallel linkage member having link parts arranged in a form of parallelogram and connected with each other by flexible parts so that the first parallel linkage member can be deformed into any other form of parallelogram in a plane perpendicular to the optical axis of the driven member one of the link parts being fixed to the holding member; an intermediate member fixed to another of the link parts of the first parallel linkage member parallel to the one thereof; a second parallel linkage member overlapped with the first parallel linkage member in parallel relation thereto, the second parallel linkage member having link parts arranged in a form of parallelogram and connected with each other by flexible parts so that the second parallel linkage member can be deformed into any other form of parallelogram in a plane perpendicular to the optical axis of the driven member , one of the link parts being fixed to the intermediate member; and a base member fixed to another of the link parts of the second parallel linkage member parallel to the one thereof, wherein the one of the link parts of the first parallel linkage member is generally perpendicular to the one of the link parts of the second parallel linkage member.

In the construction, the driven member is driven in a first direction perpendicular to the optical axis of the driven member, when the one of the link parts of the first parallel linkage member moves relative to the anther thereof. The driven member moves in a second direction perpendicular to the optical axis of the driven member, when the one of the link parts of the second parallel linkage member moves relative to the another thereof. As the one of the link parts of the first parallel linkage member is generally perpendicular to the one of the link parts of the second parallel linkage member, the driven member can be driven relative to the base member in two directions generally perpendicular to each other. For example, by means of moving the holding member and/or the intermediate member relative to the base member, the driven member can be driven.

In the construction, the holding member, the first parallel linkage member, the intermediate member, the second parallel linkage member, and the base member can be formed integral with each other, so that the image shake preventing mechanism is unitized. Moreover, it is possible to minimize the total dimensions of the image shake preventing mechanism, by means of disposing the holding member, the first parallel linkage member, the intermediate member, the second parallel linkage member, and the base member in a direction perpendicular to a direction of moving the driven member, in substantially overlapping relation with each other. Additionally, a member or a part between adjacent members or parts is not necessary to be rigid in a direction perpendicular a direction of moving the driven member, and therefor can be made thin.

Accordingly, volume and mass of the image shake preventing mechanism can be minimized.

In order to achieve the above objects, according to another aspect of the present invention, there is provided an optical device, comprising: a driven member to be driven so as to prevent the image shake; a holding member for holding the driven member; a first parallel linkage member arranged perpendicular to an optical axis of the driven member, the first parallel linkage member having link parts arranged in a form of parallelogram and connected with each other by flexible parts so that the first parallel linkage member can be deformed into any other form of parallelogram in a plane perpendicular to the optical axis of the driven member , one of the link parts being fixed to the holding member; an intermediate member fixed to another of the link parts of the first parallel linkage member parallel to the one thereof; a second parallel linkage member overlapped with the first parallel linkage member in parallel relation thereto, the second parallel linkage member having link parts arranged in a form of parallelogram and connected with each other by flexible parts so that the second parallel linkage member can be deformed into any other form of parallelogram in a plane perpendicular to the optical axis of the driven member, one of the link parts being fixed to the intermediate member; and a base member fixed to another of the link parts of the second parallel linkage member parallel to the one thereof, wherein the one of the link parts of the first parallel linkage member is generally perpendicular to the one of the link parts of the second parallel linkage member.

In the construction, the driven member is driven in a first direction perpendicular to the optical axis of the driven member, when the one of the link parts of the first parallel linkage member moves relative to the anther thereof. The driven member moves in a second direction perpendicular to the optical axis of the driven member, when the one of the link parts of the second parallel linkage member moves relative to the another thereof. As the one of the link parts of the first parallel linkage member is generally perpendicular to the one of the link parts of the second parallel linkage member, the driven member can be driven relative to the base member in two directions generally perpendicular to each other. For example, by means of moving the holding member and/or the intermediate member relative to the base member, the driven member can be driven.

In the construction, the holding member, the first parallel linkage member, the intermediate member, the second parallel linkage member, and the base member can be formed integral with each other, so that the image shake preventing mechanism is unitized. Moreover, it is possible to minimize the total dimensions of the image shake preventing mechanism, by means of disposing the holding member, the first parallel linkage member, the intermediate member, the second parallel linkage member, and the base member in a direction perpendicular to a direction of moving the driven member, in substantially overlapping relation with each other. Additionally, a member or a part between adjacent members or parts is not necessary to be rigid in a direction perpendicular a direction of moving the driven member, and therefor can be made thin.

Accordingly, volume and mass of the optical device can be minimized.

BRIEF DESCRIPTION OF THE DRAWINGS

These and other objects and features of the present invention will become clear from the following description taken in conjunction with the preferred embodiments thereof with reference to the accompanying drawings.

FIG. 9A is a plan view of an image shake preventing mechanism.

FIG. 9B is a partially sectional view thereof.

FIG. 10A is a perspective view of main part thereof.

FIG. 10B is a sectional view thereof.

FIG. 10C is a sectional view thereof.

FIG. 16 is a partly expanded section view of a modification.

DETAILED DESCRIPTION OF THE PREFERRED EMBODIMENTS

Figure 1A:
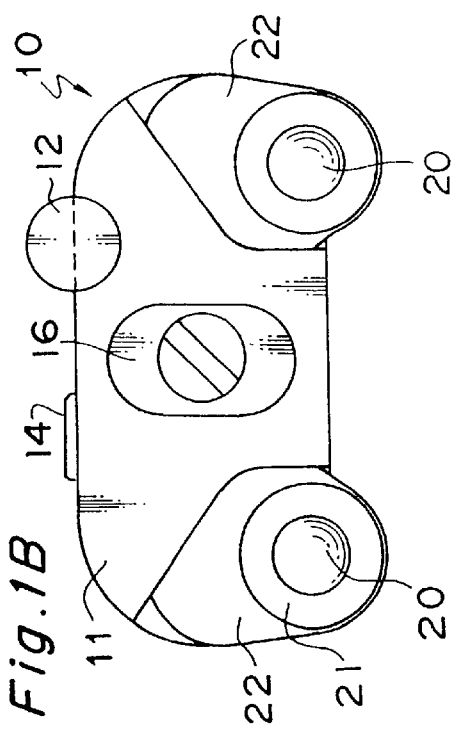
FIG. 1A is a plan view of binoculars according to an embodiment of the present invention.

Before the description of each of the preferred embodiments according to the present invention proceeds, it is to be noted that like or corresponding parts are designated by like reference numerals throughout the accompanying drawings.

A detailed description is made below upon binoculars of the preferred embodiment, with reference to FIG. 1 through FIG. 21.

The binoculars 10 have an image shake preventing mechanism 50, so that a target image can be viewed therethrough without a deviation, even if the binoculars 10 are shaken or vibrated.

Figure 1B:
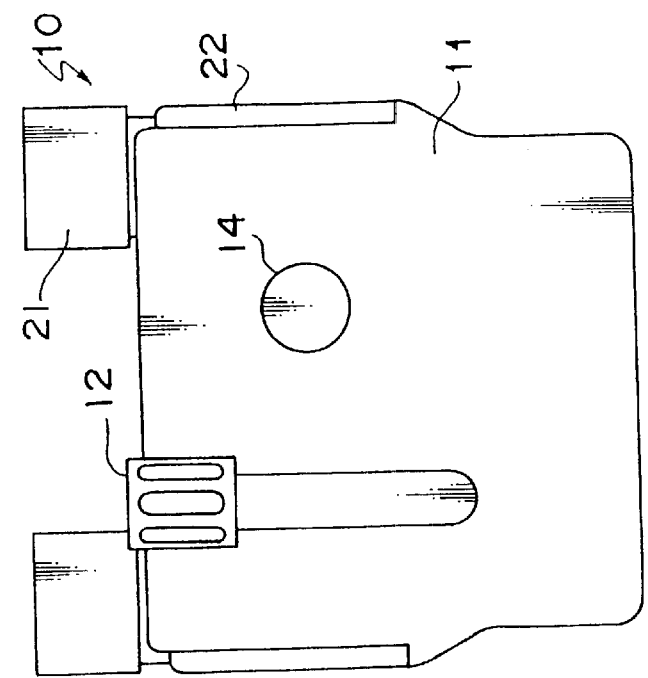
FIG. 1B is a rear view thereof.
Figure 1C:
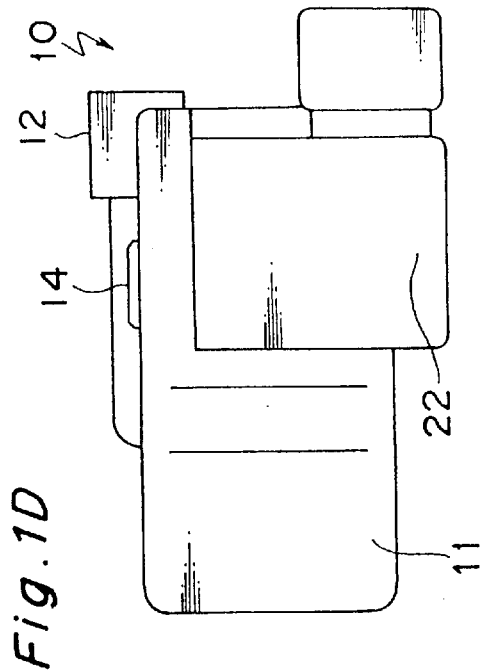
FIG. 1C is a front view thereof.
Figure 1D:
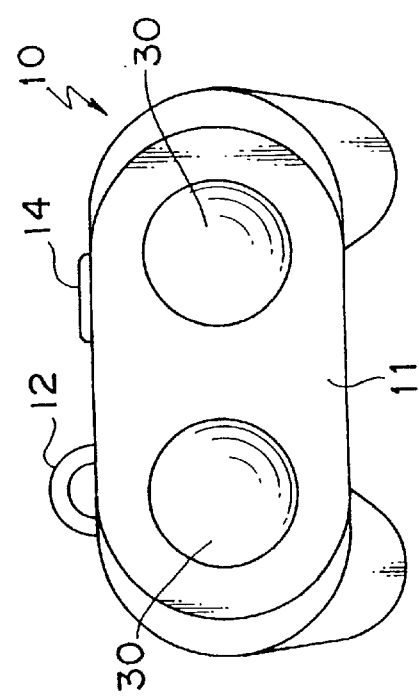
FIG. 1D is a right side view thereof.

FIGS. 1A–1D show the outside of the binoculars 10. FIG. 1A is a plan view thereof, FIG. 1B is a rear view thereof, FIG. 1C is a front view thereof, and FIG. 1D is a right side view thereof.

An image shake preventing button 14 is disposed on a top plane of a body 11 of the binoculars 10, so as to switch the image shake preventing mechanism 50 on or off. A distance between a pair of objective lenses 30 is fixed, while a distance between a pair of eyepieces 20 is changeable by tilting a pair of eyepiece portions 22 relative to the body 11. A focus adjusting button 12 is disposed on the top plane, so as to focus on the target. An outer cylinder 21 of one of the eyepiece portions 22 is rotatable, to adjust the dioptric difference between a pair of optical systems. A battery chamber lid 16 is disposed on a rear plane of the body 11, so that batteries are loaded therethrough.

Figure 2:
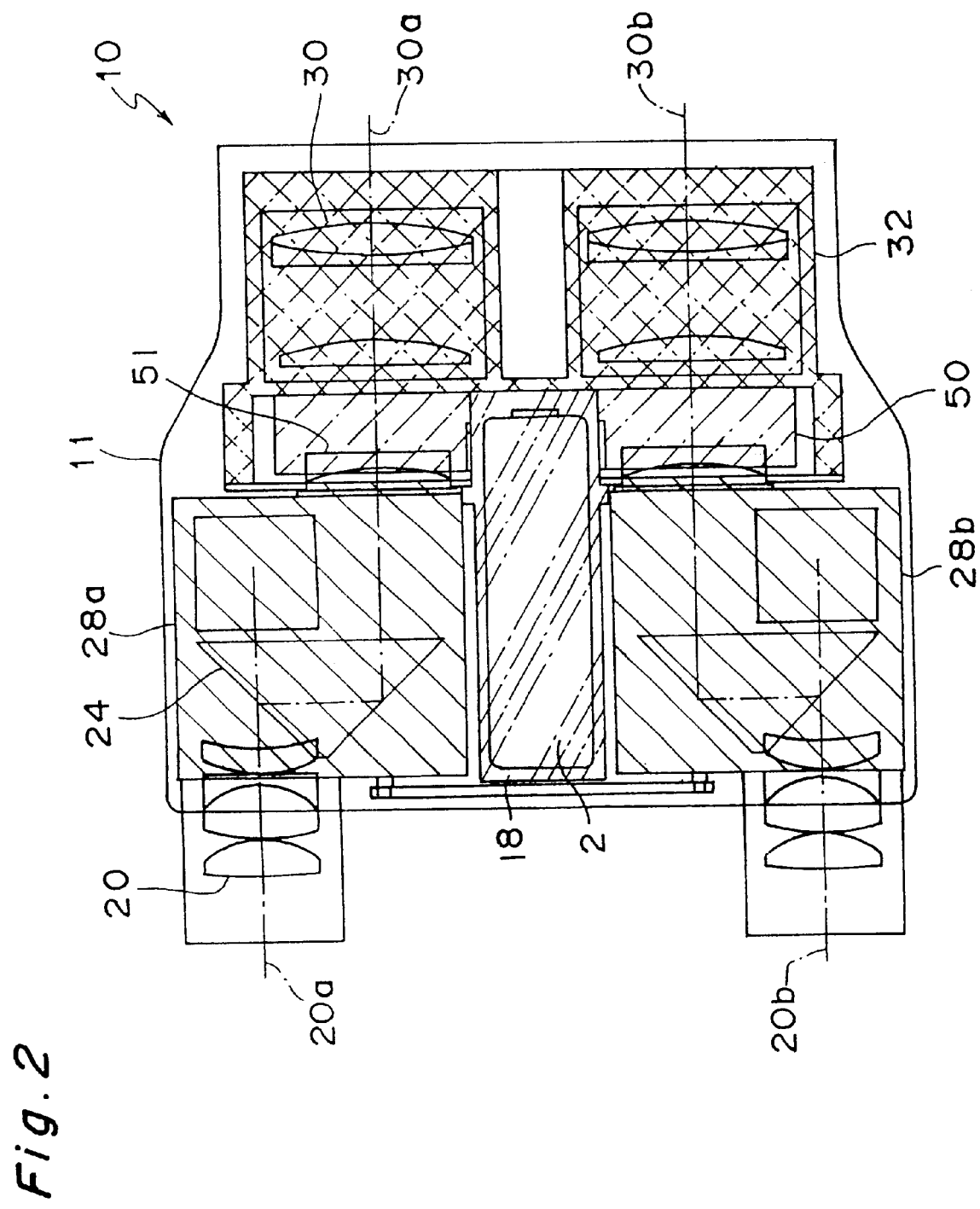
FIG. 2 is a block schematic diagram thereof.

FIG. 2 shows the arrangement inside of the binoculars 10.

The binoculars 10 have a pair of the optical systems, each of which comprises the objective lens 30, a correcting lens 51, a Porro prism 24, and the eyepiece 20, respectively.

A pair of the objective lenses 30 are fixed to an objective lens barrel 32, which is shown crosshatched in FIG. 2. The objective lens barrel 32 is fixed to the body 11 movably in a direction of optical axes of the objective lenses 30, to adjust the focus.

A pair of the correcting lenses 51 are held by the image shake preventing mechanism 50, which is shown hatched in FIG. 2, so as to be driven in two directions. A base member 60, which will be described later, of the image shake preventing mechanism 50 is fixed to the body 11.

Each of the Porro prisms 24 and each of the eyepieces 20 are fixed to each of discrete prism holders 28a, 28b, respectively. Each of the prism holders 28a, 28b is held by the body 11 movably in a direction of respect optical axes 30a, 30b of the objective lenses 30, and rotatably around respect optical axes 30a, 30b thereof.

A battery chamber case 18 is fixed to the body 11 throughout the image shake preventing mechanism 50. The battery chamber case 18 is adapted to be loaded with two cylindrical batteries 2 parallel to the optical axes 30a, 30b, or perpendicular to the line connecting both optical axes 30a, 30b, so as to supply electricity to a control circuit. The control circuit is disposed inside of the body 11 along the top plane or the bottom plane of the binoculars 10, so as to extend over or under the prism holders 28a, 28b, and the battery chamber case 18.

The binoculars 10 can be adjusted in the focus and the width of the eyepieces 20, as well as common binoculars.

Specifically, operation of the focus adjusting button 12 on the top plane of the binoculars 10 cause a pair of the objective lens barrels 32 to move axially, and then the focusing (or image-forming) points of both optical systems moves. Rotation of the outer cylinder 21 on the eyepiece portion causes the one of the eyepieces 20 to move axially, and then the diopter scale thereof changes. Thus, the dioptric difference between the optical systems can be adjusted. When a pair of the eyepiece lenses 20 move toward each other or away from each other, the prism holders 28a, 28b, holding the eyepieces 20 and the prism 24 respectively, rotate relative to the body 11 around respective optical axes 30a, 30b of the objective lenses 30. Thereby, motion of the prisms 24 changes the position of the optical axes 20a, 20b of the eyepieces 20 relative to the optical axes 30a, 30b of the objective lenses 30, so as to change the width of the eyepiece 20.

Next, referring to FIGS. 9–12 and FIGS. 17–21, a description is made below in detail on the construction of the image shake preventing mechanism 50.

The image shake preventing mechanism 50 comprises a pair of parallel linkage members, crossing each other at right angles, to support a pair of the correcting lenses 51 movably, so that the image shake preventing mechanism 50 is unitized. The image shake preventing mechanism 50 also comprises a locking mechanism for locking the image shake preventing mechanism 50.

Each of the parallel linkage members is a flat four linkage mechanism. Specifically, the parallel linkage member has: four link parts disposed on a plane in a form of parallelograms (including a rectangle and a square); and four flexible parts for connecting adjacent link parts to each other so as to allow adjacent link parts rotate or incline relatively. One of the link parts (hereinafter, also referred to as a "stationary link part") is fixed to stationary side. The other of the link parts (hereinafter, also referred to as "movable link parts") can move in the plane. One of the movable link parts opposite to the stationary link part can move in a direction generally parallel to a direction in which the stationary link part extends.

Figure 14:
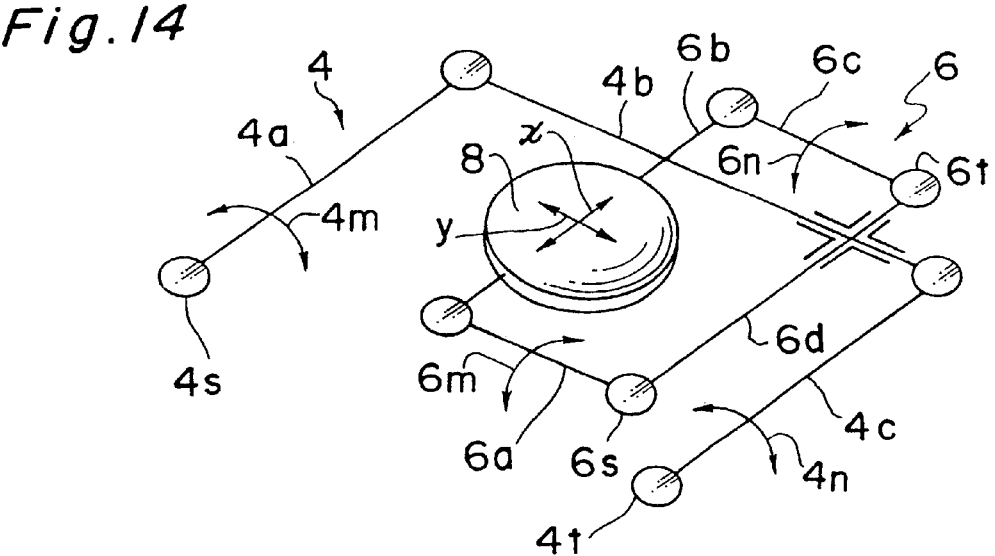
FIG. 14 is a schematic perspective view of the image shake preventing mechanism.

FIG. 14 shows the image shake preventing mechanism using the parallel linkage members schematically.

A first parallel linkage member 6 has four link parts 6a, 6b, 6c, 6d, connected by four flexible part to form a parallelogram. A correcting lens 8 to be driven is fixed to the movable link part 6b opposite to the stationary link part 6d. Movable link parts 6a, 6c, which are paired with the stationary link part 6d by the flexible link parts 6s, 6t, rotate or incline as shown by arrows 6m, 6n, and then the correcting lens 8 moves generally in a first direction, as shown by an arrow x, parallel to the stationary link part 6d.

A second parallel linkage member 4 also has four link parts 4a, 4b, 4c, 4d (not shown), connected by four flexible part so as to form a parallelogram. The stationary link part 6d of the first linkage member 6 is fixed to the movable link part 4b of the second parallel linkage member 4. The movable link part 4b opposes to the stationary link part 4d (not shown), which extends imaginarily between the flexible parts 4s, 4t. Movable link parts 4a, 4c, which are paired with the stationary link part 4d (not shown) by the flexible parts 4s, 4t, rotate or incline as shown by arrows 4m, 4n, and then the correcting lens 8 and the first linkage member 6 move generally in a second direction, as shown by an arrow y, parallel to the stationary link part 4d (not shown). The stationary link part 6d and the stationary link part 4d (not shown) are disposed to cross each other at right angles. Therefore, the correcting lens 8 can be held to move generally in the first direction x and the second direction y, crossing each other at right angles.

Figure 15A:
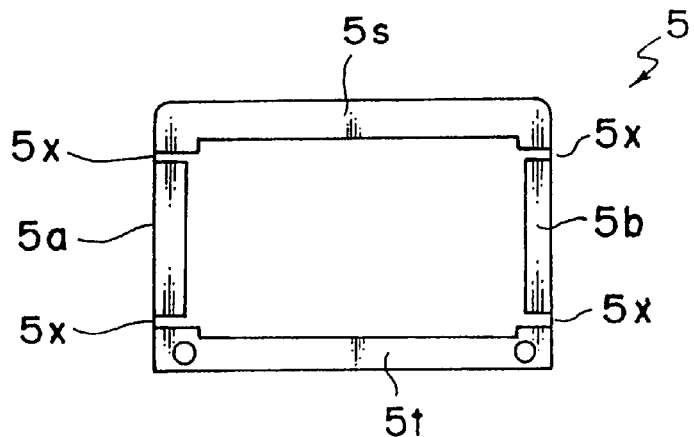
FIG. 15 is a schematic illustration of a parallel linkage member before transforming.
Figure 15B:
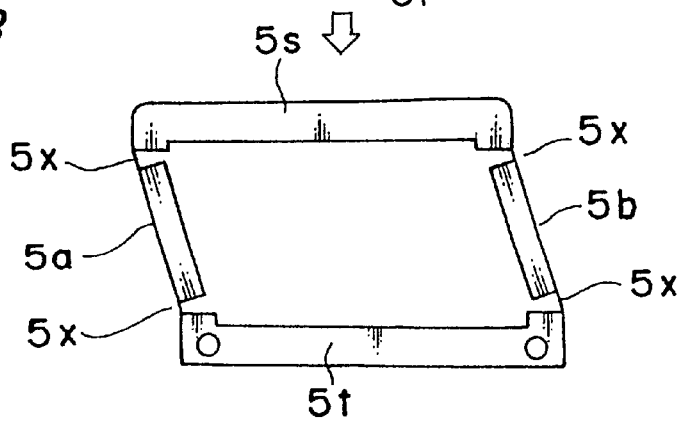

FIGS. 15A, 15B show the parallel linkage member schematically. The parallel linkage member 5 is formed with a thin resilient plate. Link parts 5a, 5b, 5s, 5t are connected by flexible parts 5x. The flexible parts 5x are less rigid than the link parts 5a, 5b, 5s, 5t, and can deform resiliently more easily than the link parts 5a, 5b, 5s, 5t. For example, each of the flexible parts 5x consists of only a part perpendicular to the figure plane, while each of the link parts 5a, 5b, 5s, 5t consists of not only a part perpendicular to the figure plane, but also another part parallel to the figure plane so as to form a L-shaped section with high rigidity.

As shown in FIG. 15B, the flexible parts 5x can deform without deformation of the link parts 5a, 5b, 5s, 5t, and one of the movable link parts 5s, opposite to the stationary link part 5t, can move generally in a direction parallel to the stationary link part 5t.

Figure 11:
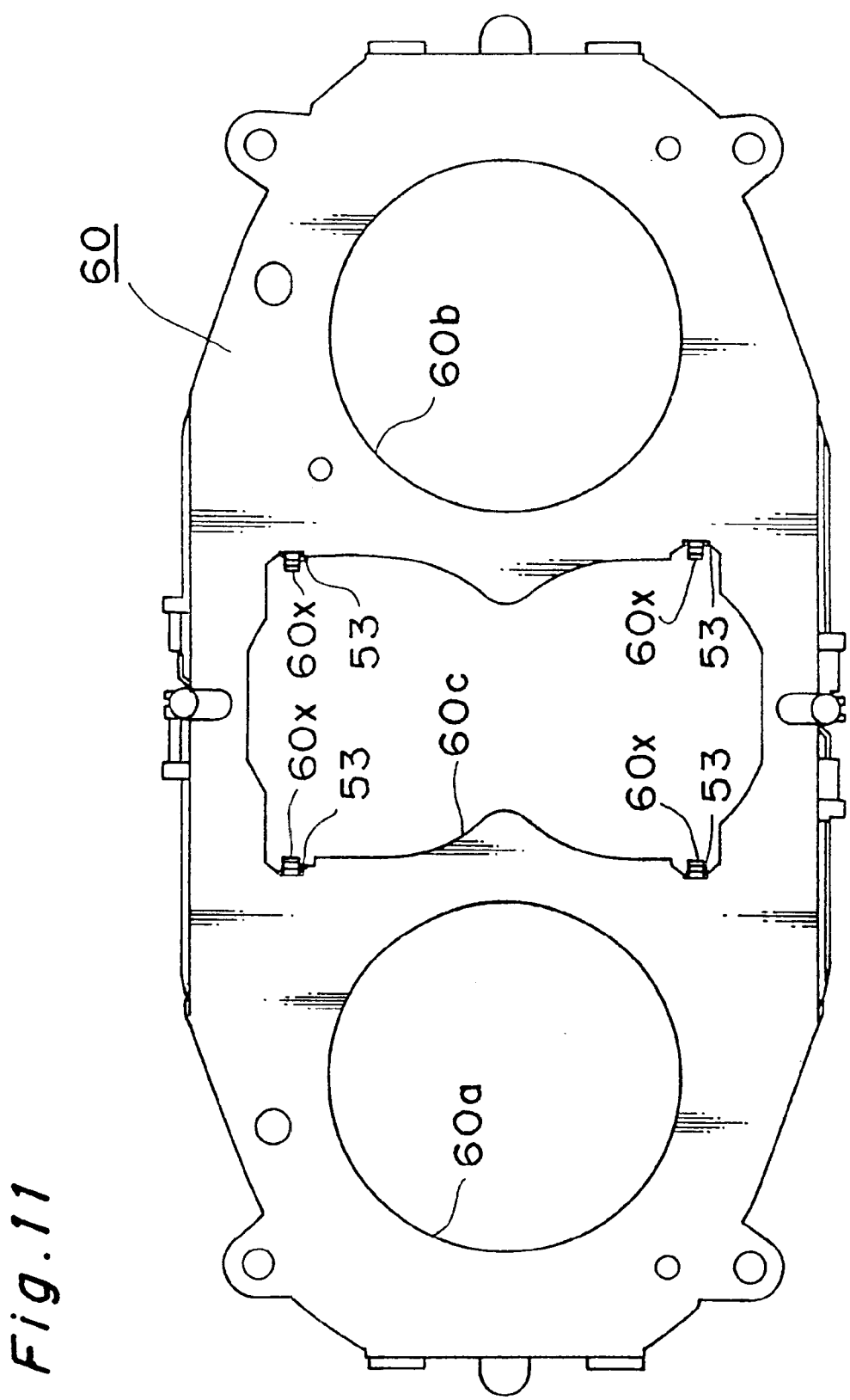
FIG. 11 is an elevation view thereof, viewing from objective lenses.
Figure 12:
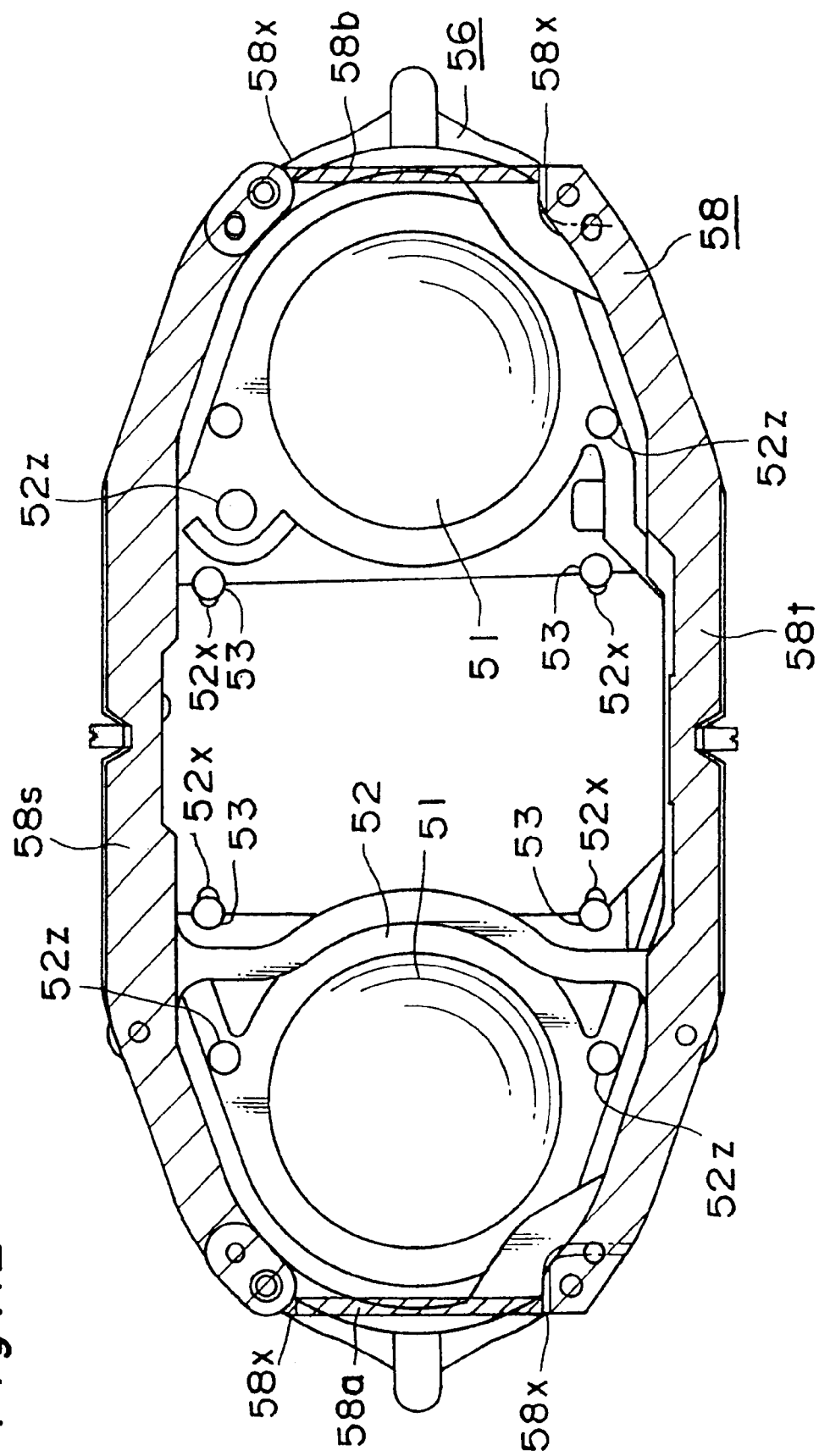
FIG. 12 is an elevation view thereof, viewing from objective lenses after removing a base member.

FIG. 9A is a plan view of the image shake preventing mechanism 50, viewing from the eyepieces. FIG. 9B is a partially sectional view thereof. FIG. 10A is a perspective view of a main part of the parallel linkage member. FIG. 10B is a sectional view taken through the center of the correcting lens. FIG. 10C is a sectional view of the locking mechanism. FIG. 11 is an elevation of the image shake preventing mechanism 50, viewing from the objective lenses. FIG. 12 is an elevation thereof, viewing from the objective lenses after removing the base member.

The image shake preventing mechanism 50 comprises: a holding member 52 for holding a pair of the correcting lenses 51; a vertical parallel linkage member 54, which is the first parallel linkage member, for supporting the holding member 52 movably in only a vertical direction; an intermediate member 56 for supporting the vertical parallel linkage member 52; a horizontal parallel linkage member 58, which is the second parallel linkage member, for supporting the intermediate member 56 movably in only a horizontal direction; a base member 60 for supporting the horizontal parallel linkage member 58; and urging springs 53 for engaging with the holding member 52 and the base member 60.

Figure 17:
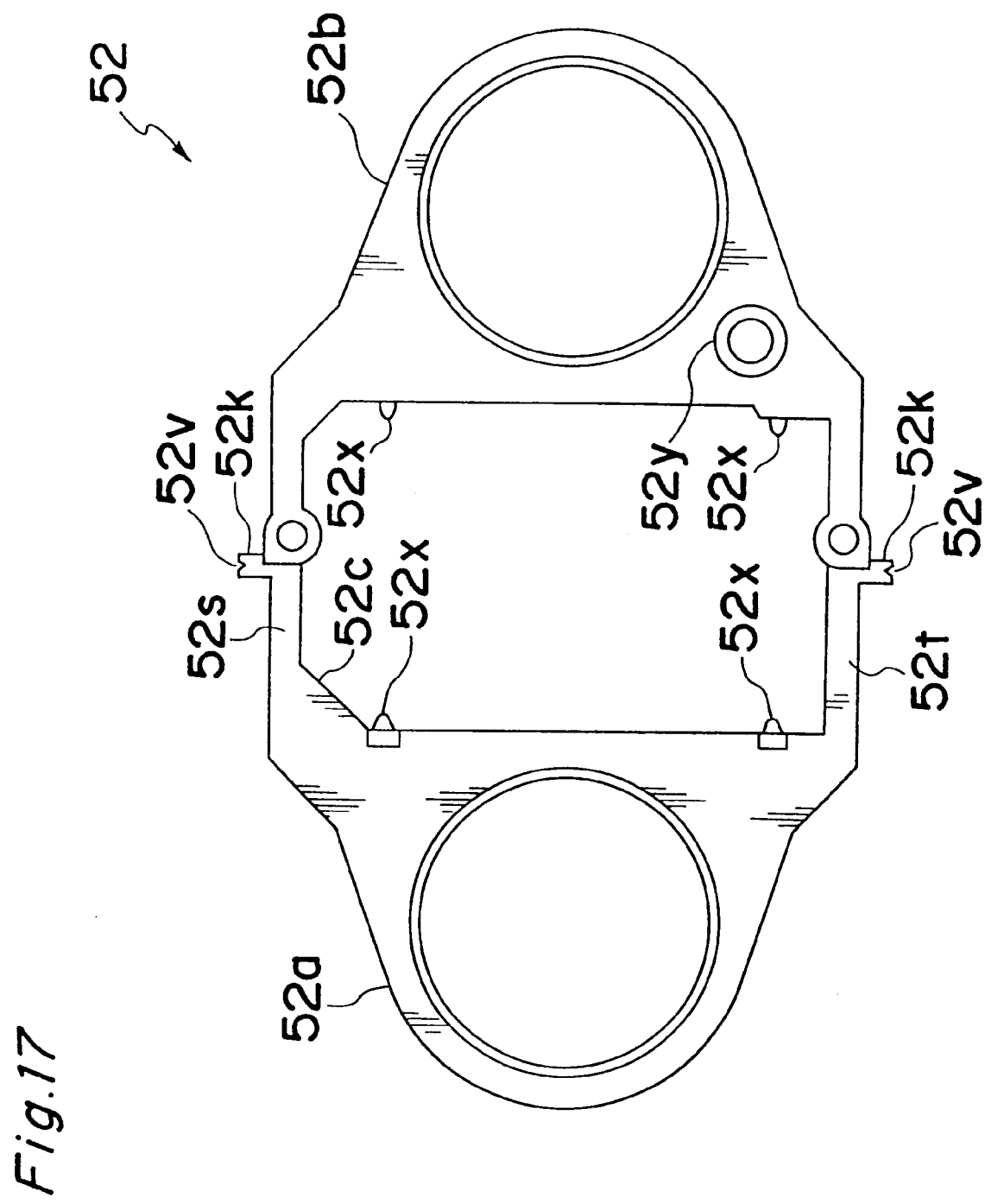
FIG. 17 is a schematic plan view of a holding member.

Referring to FIGS. 9A, 17, the holding member 52 is an identical part. The holding member 52 has a pair of lens frames 52a, 52b, which are connected to a pair of beams 52s, 52t. The holding member 52 has a hole 52c formed therethrough, into which the battery chamber case 18 are inserted. As shown in FIGS. 9A, 10C, 12, and 17, the holding member 52 has four hooking portions 52x, which are protruded into the hole 52c, to be hooked on by the urging springs 53, so that standard projections 52z of the holding member 52 are urged toward standard surfaces 60s of the base member 60. As shown in FIG. 10C, the holding member 52 has a pair of tapered holes 52y, formed through the lens frames 52b, for the locking mechanism. The beams 52s, 52t have a pair of projections 52k having V-shaped grooves 52v for receiving a drive string made of shape memory alloy, which will be described later, so that the line joining both bottoms of the V-shaped grooves 52v goes through the center of gravity.

Figure 18:
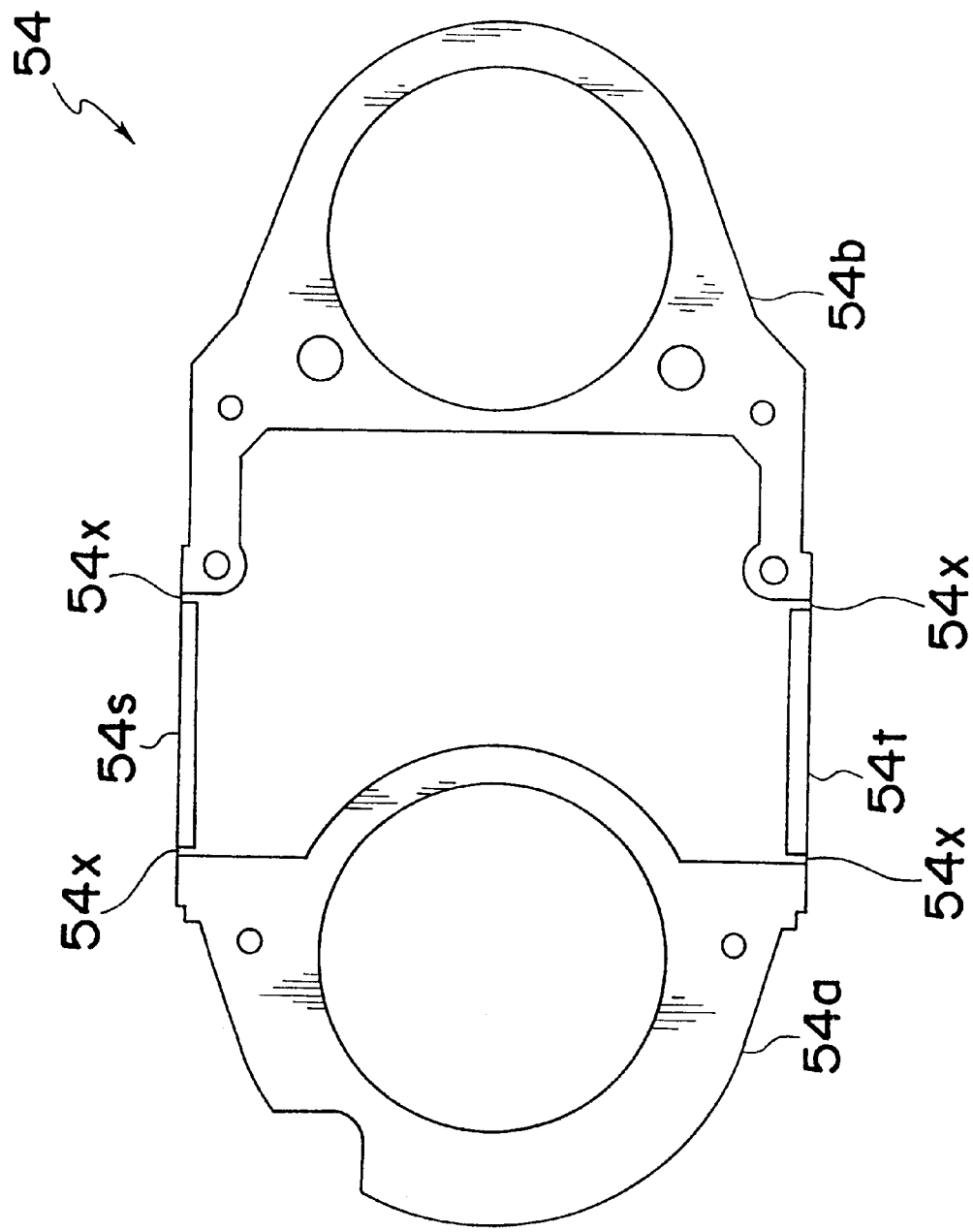
FIG. 18 is a schematic plan view of a first parallel linkage member.

The vertical parallel linkage member 54 is supported along a plane common with the holding member 52 and the intermediate member 56, as shown in FIG. 9B. The vertical parallel linkage member 54 is made of a thin resilient plate so as to form the first parallel linkage member, in which the movable link part opposite to the stationary link part can move generally in a vertical direction. Specifically, as shown in FIGS. 9A and 18, a pair of fixing portions 54a, 54b, which are link parts, are connected with each end of a pair of link arms 54s, 54t, which are link parts, extending vertically, by the flexible parts 54x. One of the fixing portions 54a is fixed to the intermediate member 56, as a stationary link part. Another of the fixing portions 54b is fixed to the holding member 52. As shown in FIG. 10A, the vertical parallel linkage member 54 is folded down toward the objective lenses along the link arms 54s, 54t generally at right angles. Thereby, the fixing portions 54a, 54b and the link arms 54s, 54t have L-shaped section. As shown in FIGS. 9A and 10A, flexible parts 54x, consisting of only a narrow vertical part, are disposed between the fixing portions 54a, 54b and the link arms 54s, 54t. The flexible parts 54x are less rigid, and more bendable resiliently than the fixing portions 54a, 54b and the link arms 54s, 54t. The angle between the fixing portions 54a, 54b and the link arms 54s, 54t is changeable in a predetermined range. Therefore, the holding member 52 or the correcting lenses 51 can move generally in a vertical direction relative to the intermediate member 56 or the base member 60.

Figure 19:
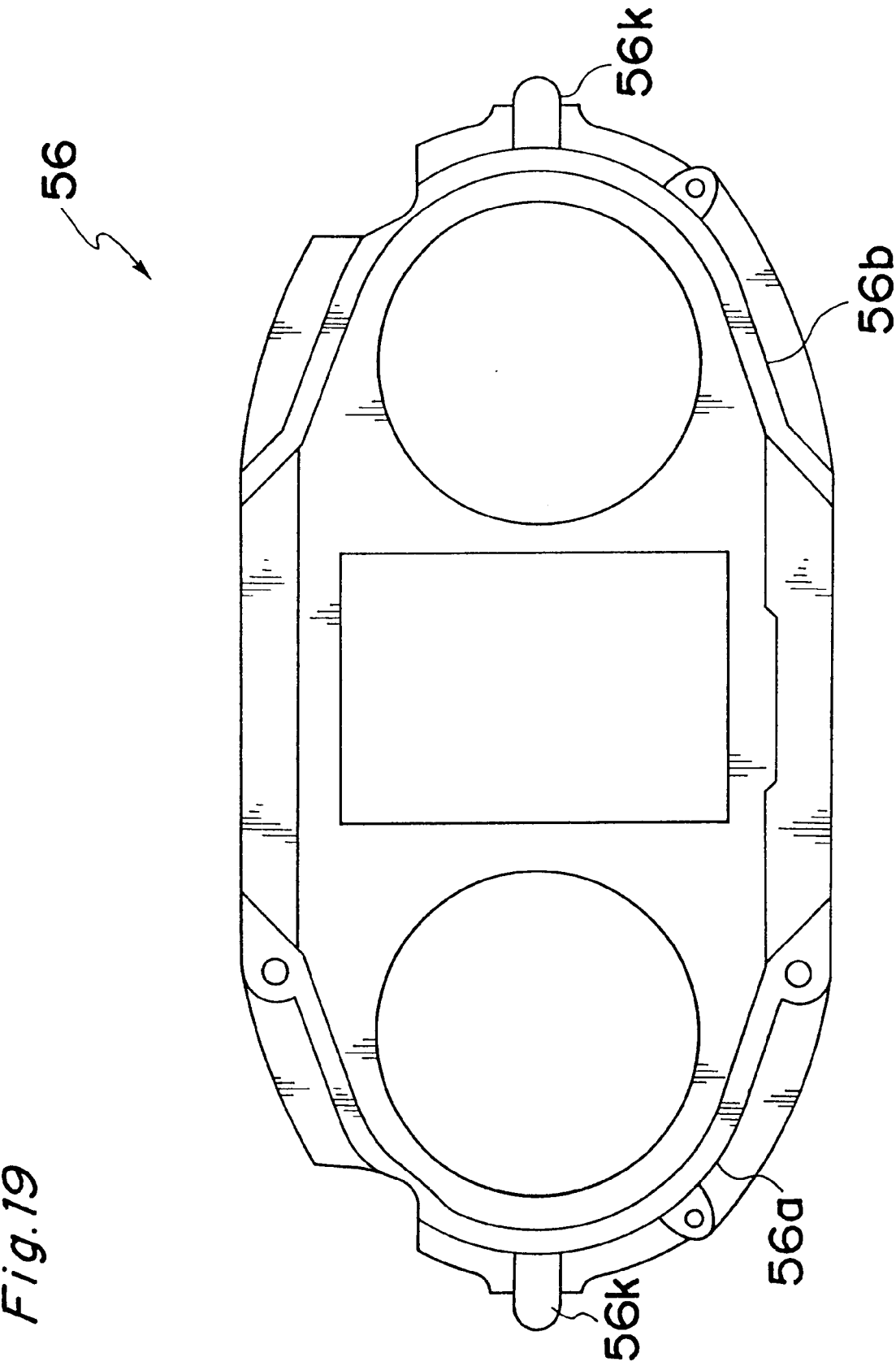
FIG. 19 is a schematic plan view of an intermediate member.
Figure 20:
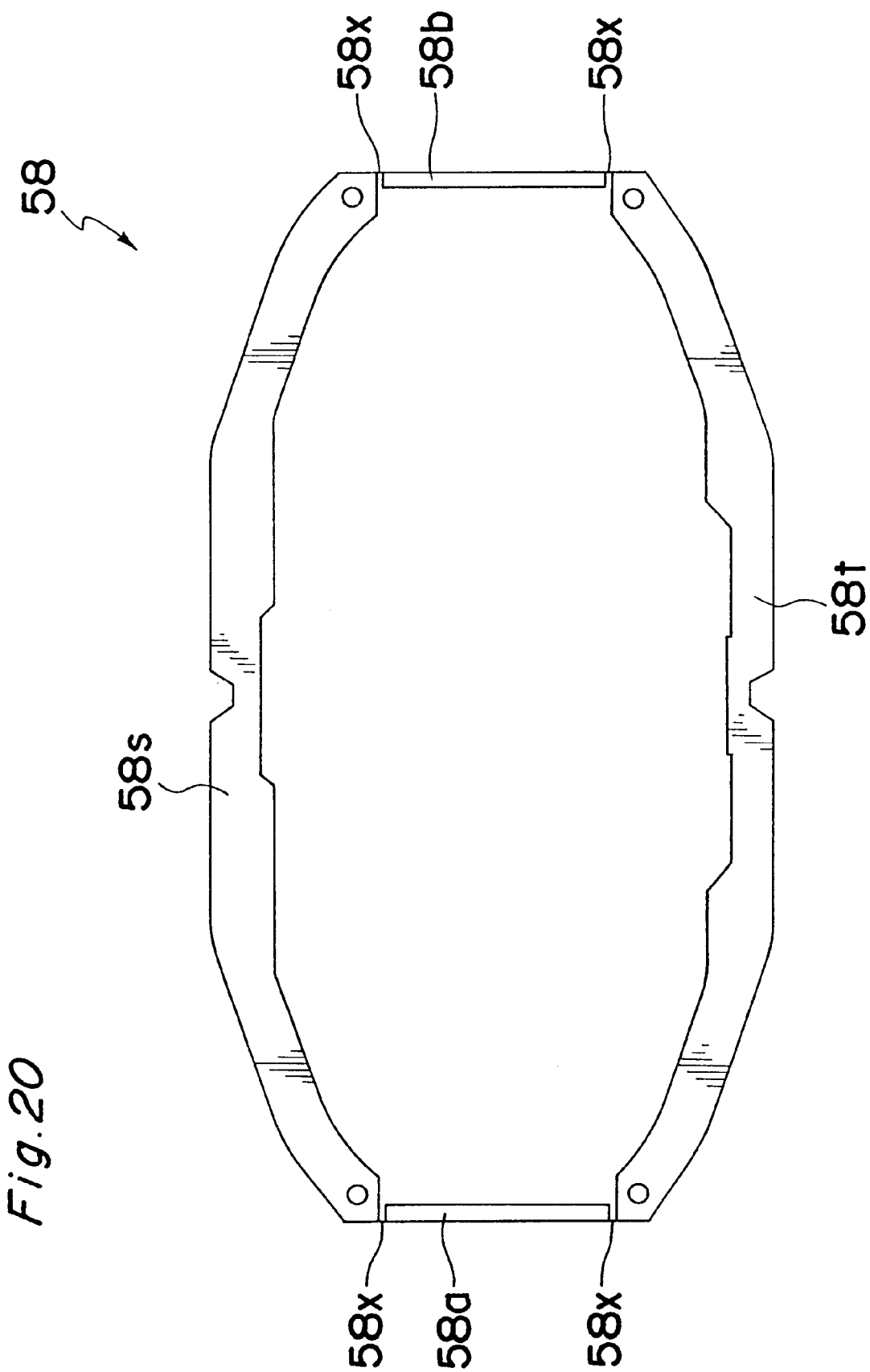
FIG. 20 is a schematic plan view of a second parallel linkage member.

Referring to FIGS. 9B, 19, the intermediate member 56 has a main body 56c, disposed between the holding member 52 and the base member 60. The main body 56c has a pair of holes formed therethrough to extend free of the optical path, and a central hole formed therethrough to insert the battery chamber case 18 therethrough. As shown in FIGS. 9A, 9B, a pair of reinforcing ribs 56a, 56b, surrounding the holding member 52 and extending up to the top thereof, protrude from the main body 56c. Each of the reinforcing ribs 56a, 56b has a projection 56k, protruding in a horizontal direction outwardly, respectively. Each of the projections 56k has a V-shaped groove 56v for receiving a drive string made of shape memory alloy, which will be described later, at the tip thereof, respectively.

The horizontal linkage member 58 is disposed between the intermediate member 56 and the base member 60, as shown in FIG. 10B. As well as the vertical linkage member 54, the horizontal parallel linkage member 58 is made of a thin resilient plate so as to form a parallel linkage member, in which the movable link part opposite to the stationary link part can move generally in a horizontal direction. Specifically, as shown in FIG. 12, the horizontal parallel linkage member 58 has a pair of link arms 58a, 58b, which are connected with each end of a pair of fixing portions 58s, 58t by the flexible parts 58x. The horizontal parallel linkage member 58 is folded down toward the objective lenses along the fixing portions 58s, 58t generally at right angles, so that the link arms 58a, 58b and the fixing portions 58s, 58t have L-shaped section. The flexible parts 58x consist of only a narrow vertical part, and can bend resiliently. One of the fixing portions 58s is fixed to the intermediate member 56. Another of the fixing portions 58t is fixed to the base member 60 as a stationary link part, so that the holding member 58 can move generally in a horizontal direction relative to the base member 60.

Figure 21:
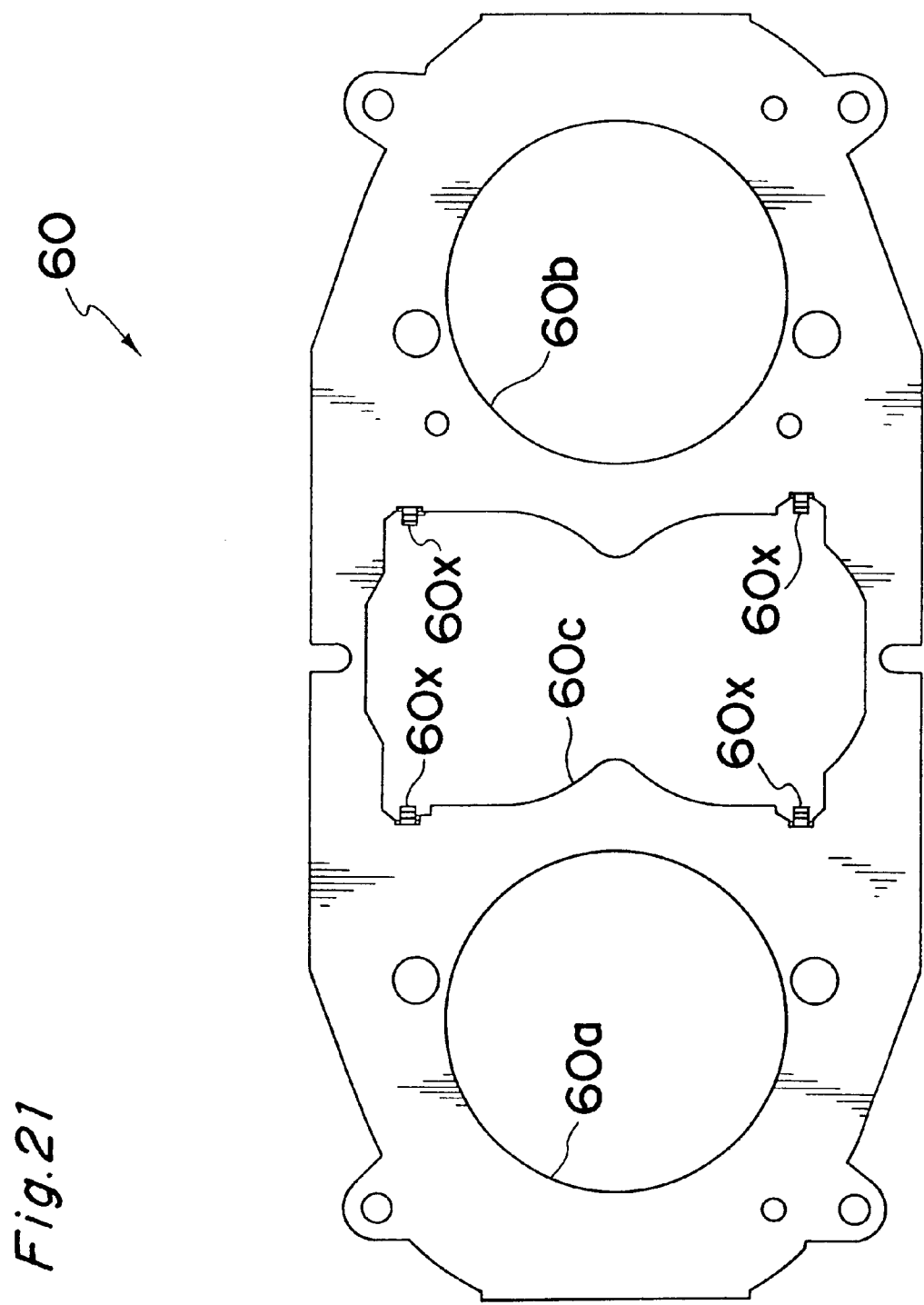
FIG. 21 is a schematic plan view of the base member.

Referring to FIGS. 11, 21, the base member 60 has a plate shape, and has a pair of holes 60a, 60b for threading the optical paths, and a central hole 60c for inserting the battery chamber case 18 therethrough. Four hooking portions 60x, on which the urging springs 53 are hooked, protrude into the hole 60c. As shown in FIGS. 10C, 21, the base member 60 has the standard surfaces 60s, and a holding portion 60t for holding position sensors (or photorefrectors) 80, which detect the vertically moving amount and the horizontally moving amount of the holding member 52. The base member 60 has a supporting portion 60k for supporting a guide rod 70 slidably. The guide rod 70 can lock the holding member 52 to prevent the holding member 52 from moving relative to the base member 60. The base member 60 has fixing holes (not shown) for fixing a pair of vertical drive units thereto at horizontal side surfaces and for fixing a pair of horizontal drive units thereto at vertical side surfaces respectively.

Four urging springs 53 engage with the holding member 52 and the base member 60, so as to assure effective contact between the standard projections 52z of the holding member 52 and the standard surfaces 60s of the base member 60. Thereby, the holding member 52 moves in a plane.

As shown in FIG. 10C, the locking mechanism comprises: the guide rod 70 extending from the base member 60 in a direction of the optical axis; a locking pin 72 having the tapered tip, which urges and holds the holding member 52 so as to prevent the holding member 52 from moving; a locking spring 74 for urging the locking pin 72 toward the base member 60; and a lock releasing lever 76 for leaving the locking pin 72 away from the holding member 52.

In normal sate, in which the image shake preventing mechanism 50 is not used, the holding member 52 is locked by the locking pin 72. In correcting state, in which the image shake preventing mechanism 50 is used, the holding member 52 is unlocked and the guide rod 70 prevents the holding member 52 from moving perpendicular to the guide rod 70 beyond a predetermined range. A linkage mechanism (not shown), disposed between the image shake preventing button 14 and the locking pin 72, converts the pushing motion of the image shake preventing button 14 into the movement of the lock releasing lever 76 in a releasing direction, so as to unlock the holding member 52.

Next, referring to FIGS. 3–8, a description is made below in detail on a construction of the drive unit.

Each end of a drive string made of shape memory alloy is fixed to a supporting member, so that the drive unit is unified.

Figure 3:
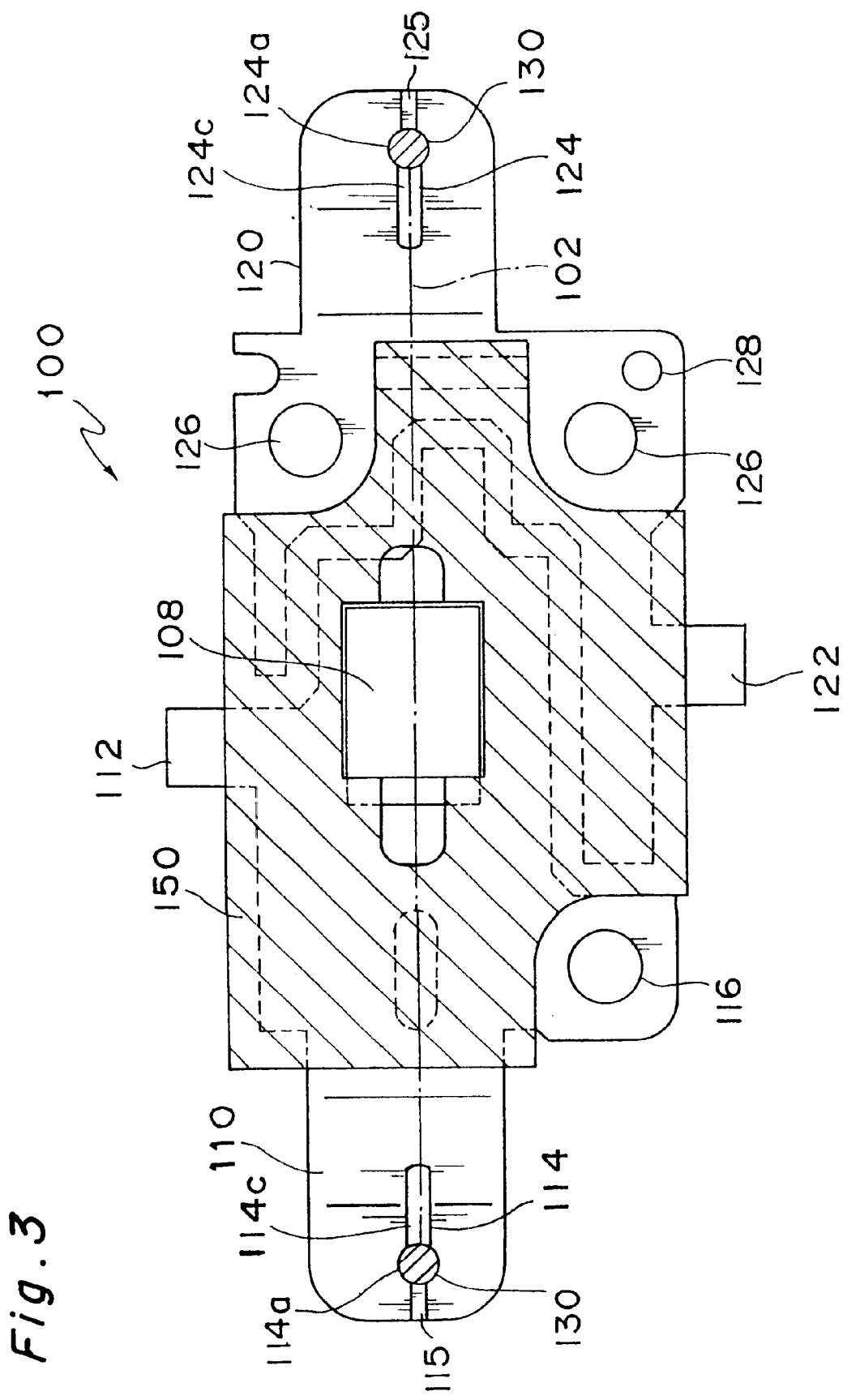
FIG. 3 is a plan view of a drive unit thereof.
Figure 4:
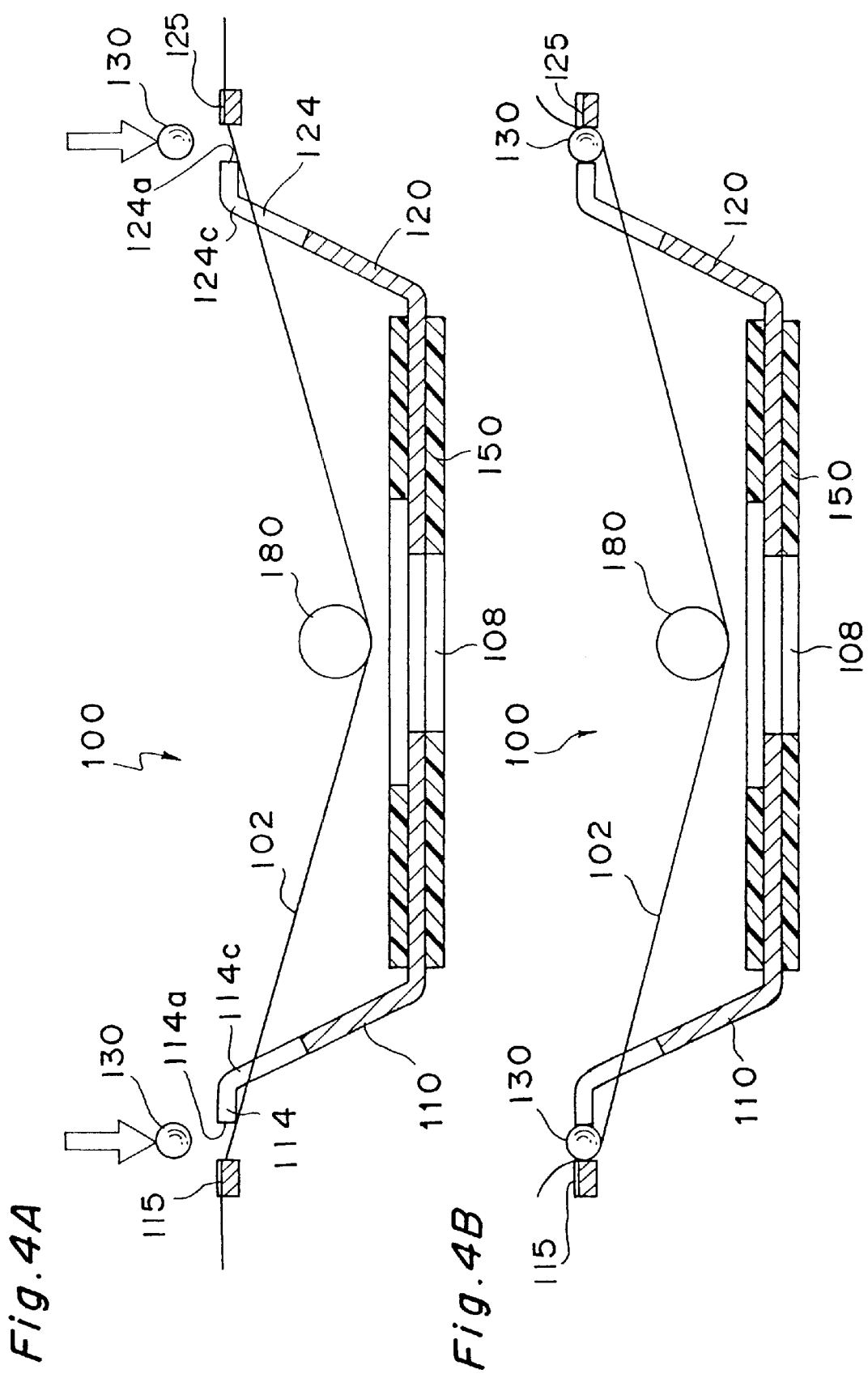
FIG. 4A is a sectional view of the drive unit before fixing a drive string.
FIG. 4B is a sectional view of the drive unit after fixing a drive string.

As shown in FIGS. 3 and 4, the supporting member is formed as an integral part. Two terminal plates 110, 120, separate from each other, are formed integral with resin 150, which is shown hatched in FIG. 3, so as to isolate terminal plates 110, 120 from each other electrically. Instead of the resin 150, the terminal plates 110, 120 may be formed integral with any isolate material by the adhesive. Each end of the drive string is fixed to each fixing portion of the terminal plates 110, 120 respectively, as described below.

The length of the string is longer than the distance between fixing potions of the terminal plates 110, 120. When the drive unit is fixed, middle part of the drive string is urged to the driven member so that the drive string forms V-shape. Specifically, the supporting member includes an opening of U-shaped or bowed cross section. Middle part of the drive string is disposed into the opening and both ends thereof are fixed to the supporting member.

As shown in FIG. 3, neighboring portions of the terminal plates 110, 120 are used as fixing surfaces. Specifically, the neighboring portions have: fixing holes 116, 126 for fixing the drive unit 100; a positioning hole 128 for positioning the drive unit 100; wiring terminals 112, 122 for wiring electrical supply lines; and a hole 108 formed therethrough. When fixing the drive unit 100, it is easy to confirm the engagement of the drive string with the V-shaped grooves 52v, 56v of the projections 52k, 56k by seeing through the hole 108.

Adjacent to the opening, the drive unit 100 has receiving surfaces, which extends on a common plane parallel to the fixing surface. The receiving surfaces have keyholes 114, 124 and guide recesses 115, 125. The keyholes 114, 124 are formed throughout the terminal plates 110, 120. Each of the keyholes 114, 124 has a circular part 114a, 124a, and a straight part 114c, 124c extending inwardly from the circular part 114a, 124a, so that the keyhole shape is formed. The guide recesses 115, 125 extend outwardly from the circular parts 114a, 124a, respectively. The guide recesses 115, 125 are formed from the receiving surfaces halfway throughout the terminal plates 110, 120, as shown in FIGS. 4A and 4B.

The drive string 102 is fixed to the circular part 114a, 124a by fitting balls 130 together with the drive string 102 tightly therein. Instead of balls 130, wedges may be fitted together with the drive string 102 tightly into the circular parts 114a, 124a.

The drive unit 100 is assembled as follows.

First, the drive string 102 is disposed on the opening of the supporting member, a low tension is placed on the drive string 102, and the drive string 102 is forced to go through the guide recess 115, 125.

Next, as shown in FIG. 4A, a tensioner 180 urges a middle part of the drive string 102 into the opening of the supporting member by a predetermined depth.

Then, as shown in FIG. 4B, a pair of balls 130 are pushed downwardly into the circular parts 114a, 124a by a predetermined depth at the same time, so as to fix the drive string 102 thereto.

In use, the drive string 102 is forced to go through the circular parts 114a, 124a across the thickens of the terminal plate 110, 120, and to go across the straight part 114c, 124c, so that the middle part of the drive string 102 is disposed inside of the opening of the supporting member.

As the drive unit can drive the driven member in only a direction, the image shake preventing mechanism 50 needs four drive units 100a–100d in order to drive the correcting lens 51 perpendicular to the optical axis, as shown in FIGS. 5–8.

Figure 5:
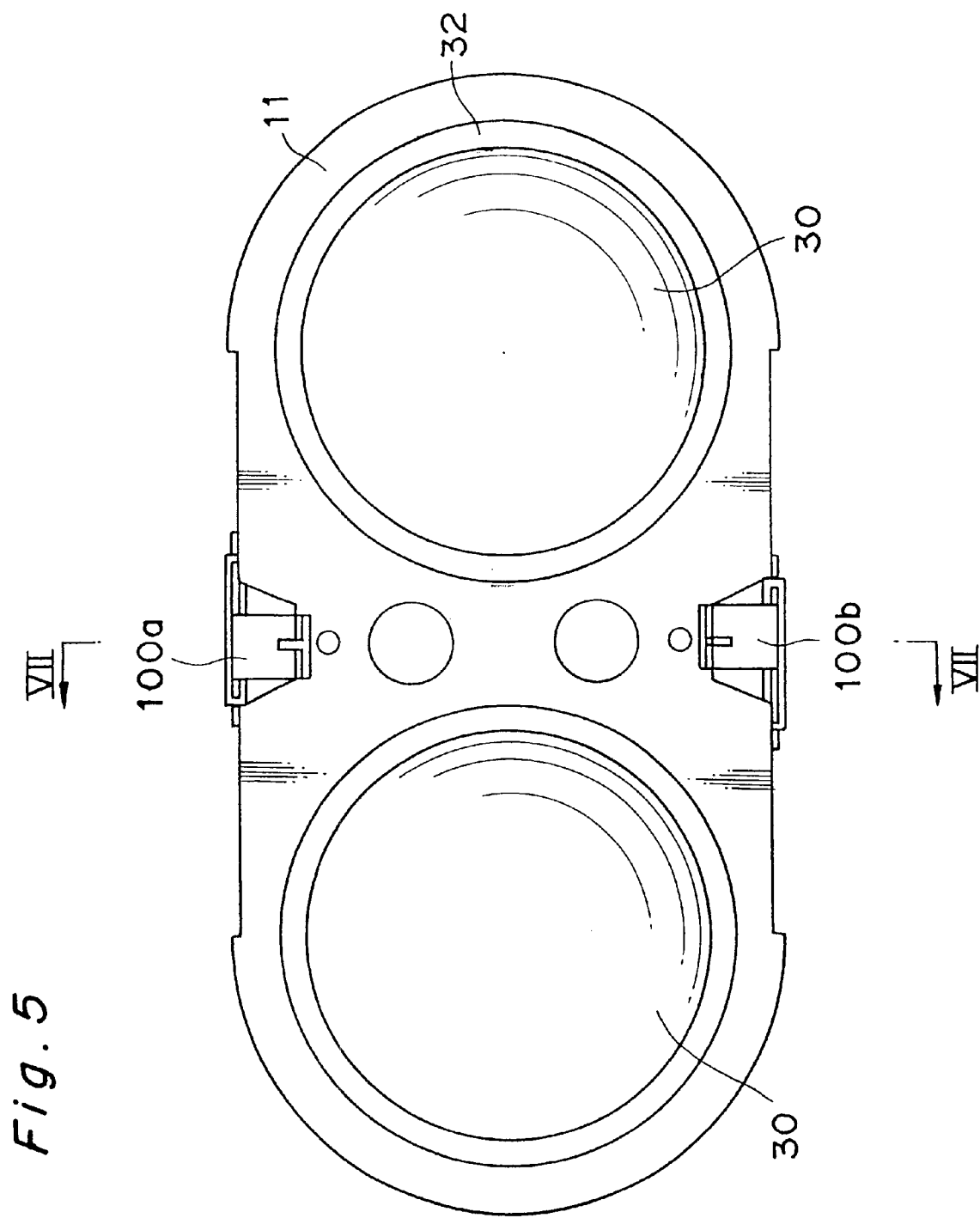
FIG. 5 is an explanatory view showing the arrangement of the drive units.
Figure 6:
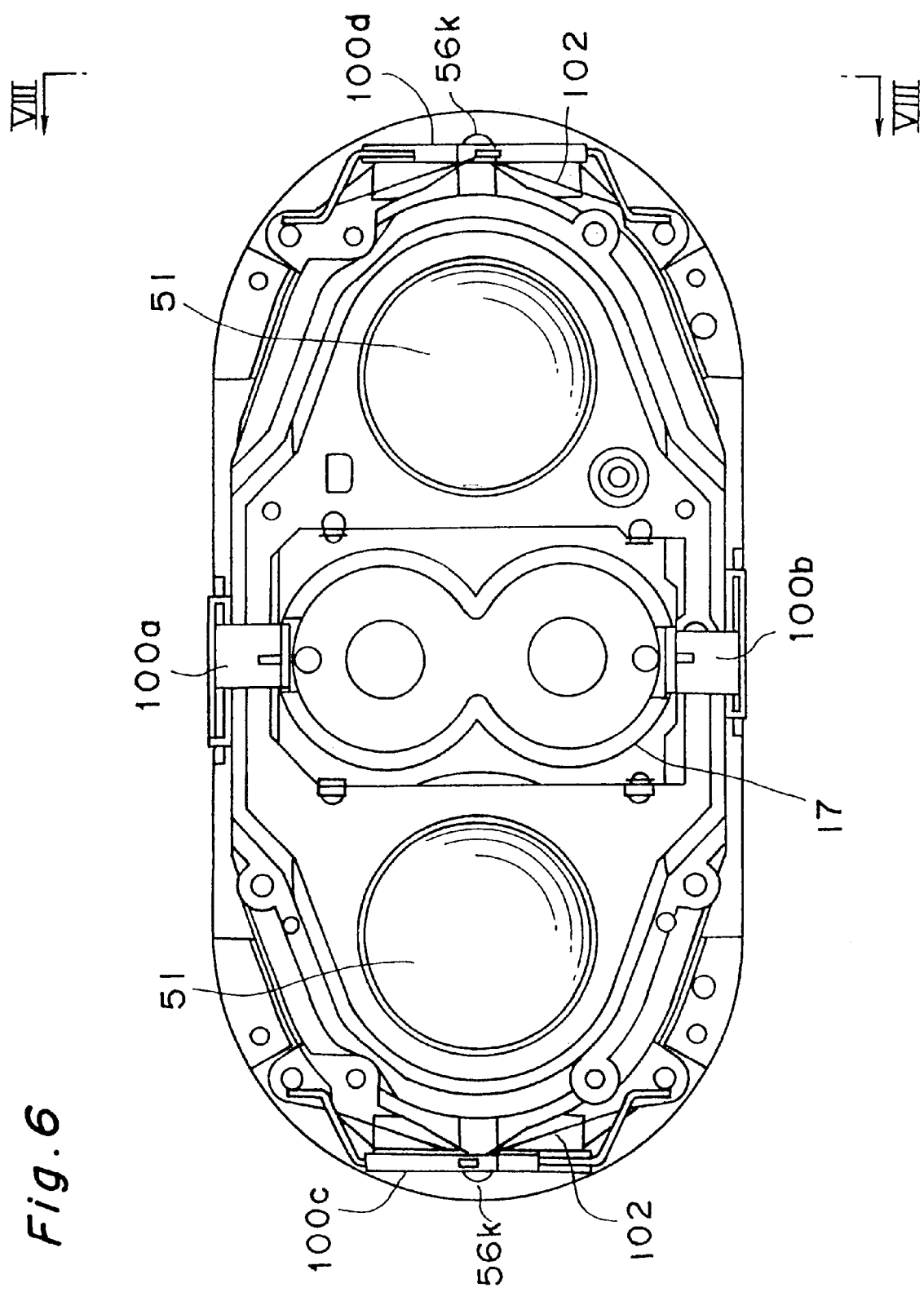
FIG. 6 is an explanatory view showing the arrangement of the drive units.
Figure 7:
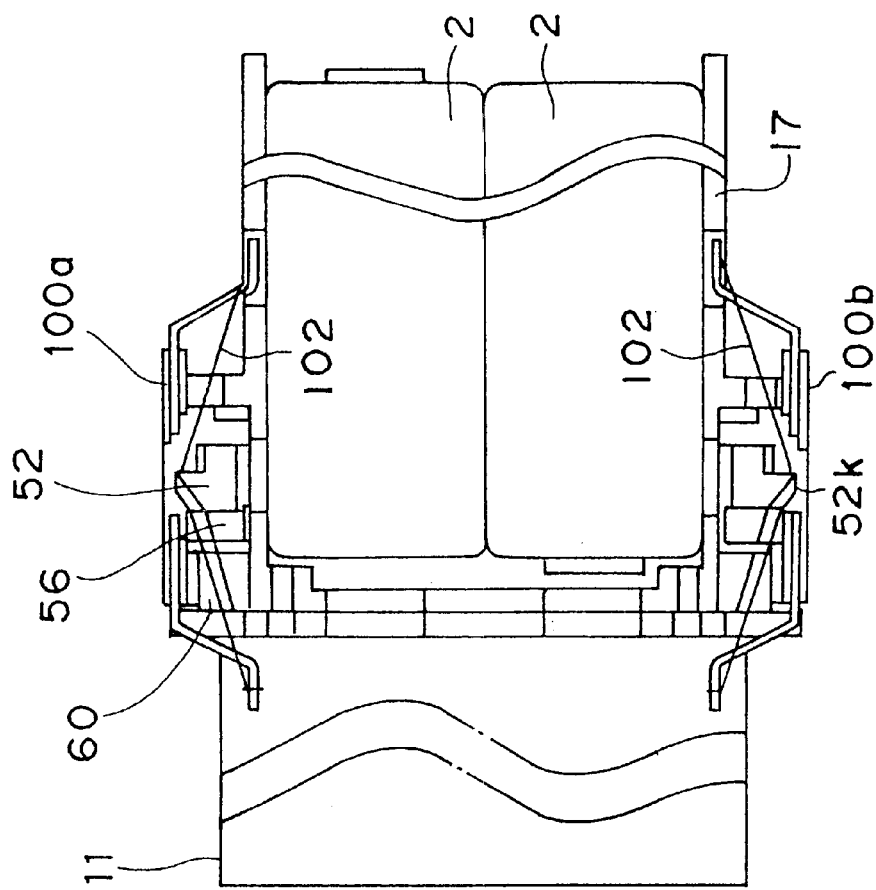
FIG. 7 is a section view taken on a line VII—VII in FIG. 5.
Figure 8:
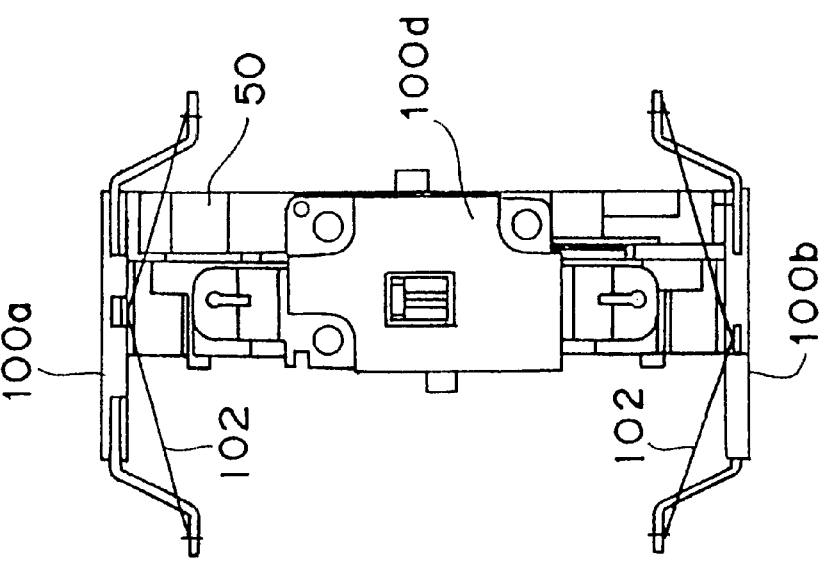
FIG. 8 is a side view taken on a line VIII—VIII in FIG. 6.

FIG. 5 is a front view of the image shake preventing mechanism 50, viewing from the side of the objective lens, with the body 11 being removed. FIG. 6 is a front view of the image shake preventing mechanism 50, viewing it from the side of the objective lenses, with the object lens barrel 32 being removed. FIG. 7 is a sectional view taken on a line VII—VII of FIG. 5. FIG. 8 is a sectional view taken on a line VIII—VIII of FIG. 6.

As shown in FIG. 6, the drive units 100c, 100d for horizontal drive are fixed along the curved portion of the image shake preventing mechanism 50. As shown in FIG. 5, the drive units 100a, 100b for vertical drive are disposed and fixed so that they extend along and beyond a pair of recesses of the objective lens barrel 32. V-shaped drive strings of the drive unit 100c, 100d for horizontal drive are included in a common plane, which is parallel to a moving plane of the correcting lenses 51. V-shaped drive strings of the drive unit 100a, 100b for vertical drive are included in another common plane, which is perpendicular to a moving plane of the correcting lenses 51.

Specifically, the drive unit 100a, 100b for vertical drive are disposed oppositely at each side of the holding member 52, which can move in any directions parallel to the standard surfaces of the base member 60. Drive strings of the drive unit 100a, 100b engage respective projection 52v of the holding member 52 so as to form V-shape included in a common plane, which is perpendicular to the standard surfaces of the base member 60. The drive unit 100c, 100d for horizontal drive are disposed oppositely at each side of the intermediate member 56, which can move only horizontally. Drive strings of the drive unit 100a, 100b engage respective projection 56k of the intermediate member 56 so as to form V-shape included in another common plane, which is parallel to the standard surfaces of the base member 60.

As described above, when seeing through the hole 108, it is easy to confirm the engagement of the drive strings of the drive units with the V-shaped grooves 52v, 56v of the projections 52k, 56k of the image shake preventing mechanism 50. As shown in FIG. 6, the projections 56k of the intermediate member 56 protrude through respective hole of the drive units 100c, 100d, so as to prevent the intermediate member 56 from moving in a direction of the optical axes.

Figure 13:
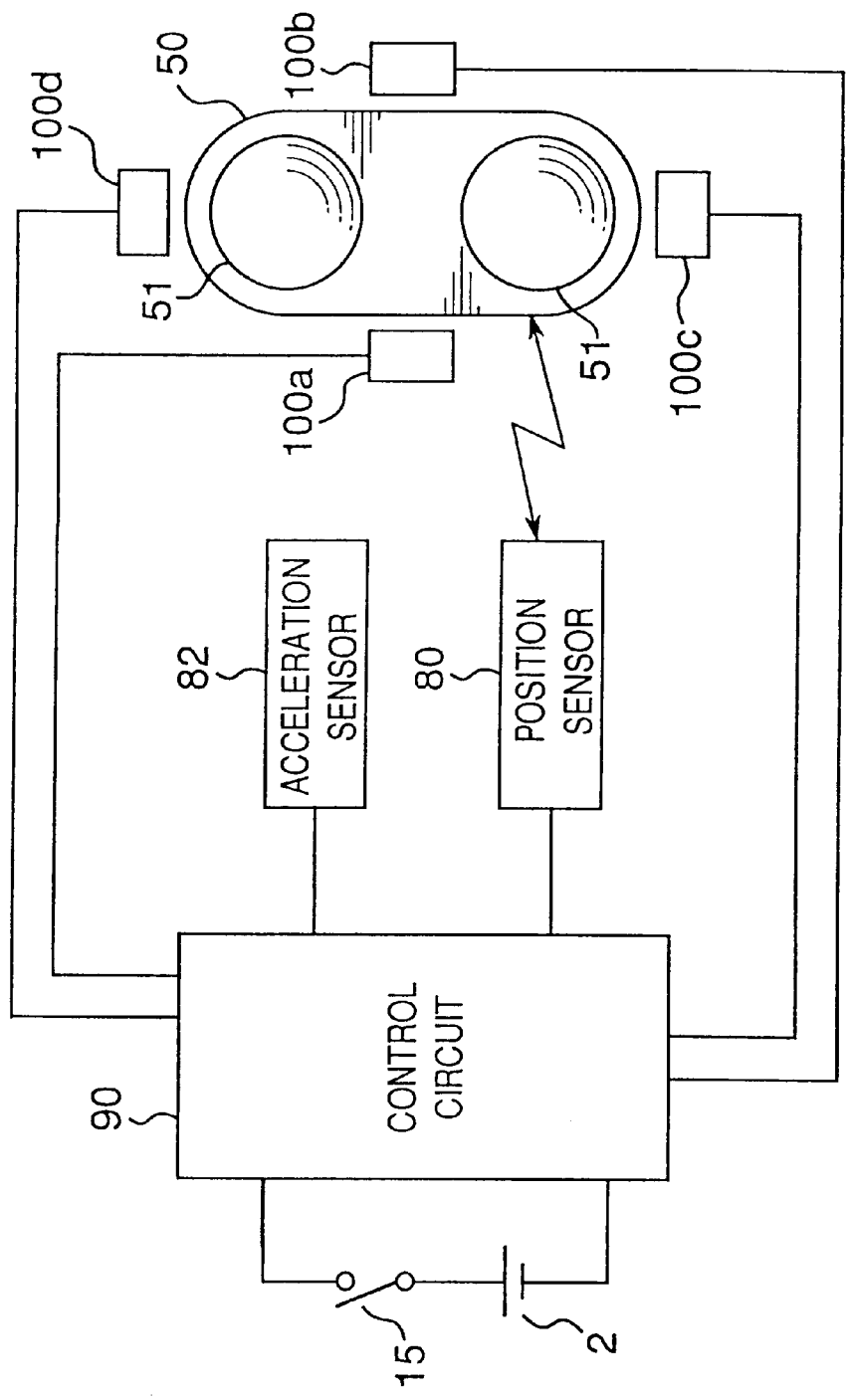
FIG. 13 is a block diagram of a control system.

FIG. 13 is a block diagram of the control system of the binoculars 10.

The control circuit 90 for controlling the binoculars 10 are connected with the position sensors 80, an acceleration sensor 82, drive units 100a–100d, a main switch 14, and batteries 2 for supplying electricity.

The position sensors 80 detect the position of the holding member 52 of the image shake preventing mechanism 50. The acceleration sensor 82 is, for example, a gyro sensor, and disposed at a predetermined position inside of the body 11, so as to detect the displacement of the binoculars 10, caused by shake and so on. The main switch 15 turns on, when operation of image shake preventing button 14 forces the image shake preventing mechanism 50 into unlocking or releasing. Specifically, when pushing the image shake preventing button 14, the locking pin 72 of the locking mechanism is pulled up by the linkage mechanism (not shown) and the locking state of the image shake preventing mechanism is released so as to allow the correcting lens 51 to move. The main switch 15 is disposed in the linkage mechanism and forced into turning on by final part of releasing stroke. The control circuit 90 includes a servo circuit for driving the drive units 100a–100d. The control circuit 90 drives the drive units 100a–100d, based on the outputs of the acceleration sensor 82 and the position sensors 80, so as to move the correcting lenses 50 into the suitable position, in which the target image viewed throughout the binoculars 10 do not move relatively.

Next, controlling operation is described.

When operating the image shake preventing button 14 disposed on the top surface of the binoculars 10, the locking state of the image shake preventing mechanism 50 is released, and the main switch 15 turns on so as to activate the control circuit 90. The control circuit 90 calculates respective voltage to be applied on each of drive strings of drive units 100*a*–100*d*, and applied the calculated voltage thereon.

In the drive string on which the voltage is applied, Joule heat is caused because of the resistance of the drive string. The drive string heated by the Joule heat shrinks by the memorized length. The shrink of the drive string is converted into the displacement of the driven member efficiently. The shrink of the drive string enlarges the angle of L-shape of the drive string. Thereby, the holding member 52 and/or the intermediate member 56 move(s) away from the drive unit(s) applied the voltage thereon. The expansion ratio M=δ/λ of the displacement δ of the correcting lens to the shrink λ of the drive string is as follows:

$$M = \cos\theta/k - (1 - \sin^2\theta/k^2)^{1/2} \quad (1)$$

In the above equation, "θ" is a half of acute angel of L-shape of the drive string, and "k" is a contraction ratio of the drive string.

Middle part of the drive string of opposing drive unit is urged by the holding member 52 or the intermediate member 56, and the drive string is stretched beyond the elastic region. Driving force is a resultant force of the tension of heated L-shaped drive string. Resistant force is a resultant force of the tensions of opposing drive strings, the frictional resistance in moving or sliding the holding member 52 relative to the base member 60, the resilient force of the urging spring 53, and the resilient force of the flexible parts of the parallel linkage members 54, 58.

Strictly, in driving the correcting lens horizontally, the drive strings of the vertical drive units are stretched in a horizontal direction and the resistant force is caused therein. Such resistant force is caused by the extremely small displacement perpendicular to the extending direction of the drive string, and therefor can be neglected.

In case that the vertical component of shake or vibration is detected, the control circuit 90 selects either one of the vertical drive unit 100*a*, 100*b* and electrical power is supplied therefor. The drive string supplied with electrical power shrinks and pushes the holding member 52 toward the center of gravity. At that time, the vertical linkage member 54 allows the holding member 52 to move generally in a vertical direction without rotating. Specifically, in the vertical linkage member 54, the link arms 54*s*, 54*t* slant or incline, and the fixing portion 54*b* moves in parallel, while the fixing portion 54*a* does not move. Opposing flexible parts 54*x*, adjacent to both ends of the link arms 54*s*, 54*t*, bend or curve oppositely. The link arms 54*s*, 54*t*, having a L-shaped section, and the fixing portions 54*a*, 54*b* can hardly deform, because the rigidity thereof is excessively higher than that of the flexible parts 54*x*.

In case that the horizontal component of shake or vibration is detected, the control circuit 90 selects either one of the horizontal drive unit 100*c*, 100*d* and electrical power is supplied therefor. The drive string supplied with electrical power shrinks and drive the intermediate member 56 toward the center of gravity. At that time, the horizontal linkage member 58 allows the intermediate member 56 to move generally in a horizontal direction without rotating. Specifically, in the horizontal linkage member 58, the link arms 58*s*, 58*t* slant or incline, and the fixing portion 56*a* moves in parallel, while the fixing portion 56*b* does not move. Opposing flexible parts 56*x*, adjacent to both ends of the link arms 58*s*, 58*t*, bend or curve oppositely. The link arms 58*s*, 58*t*, having a L-shaped section, and the fixing portions 58*a*, 58*b* can hardly deform, because the rigidity thereof is excessively higher than that of the flexible parts 58*x*.

Accordingly, even if the binoculars 10 shake vertically and/or horizontally, a pair of directions of viewing therethrough can be kept constant, so as to prevent the image viewed therethrough from shaking.

Letting a finger go away from the image shake preventing button 14, the main switch 15 turns off, power supply to the control circuit 90 is stopped, and the binoculars 10 stop to perform. Moreover, as the locking pin 72 moves toward the base member 60, the range for moving the holding member 52 is reduced, and then the tapered tip of the locking pin 72 guides the holding member 52 into the initial position. Finally, the holding member 52 is prevented from moving and locked.

As described above, the correcting lenses 51 is held movably by combining the parallel linkage members 54, 58, in which perpendicular two pairs of the link parts are made of the common thin resilient plates. The holding member 52 is supported by one of the parallel linkage members 54, the fixing portion of which is fixed to the intermediate member 56. The intermediate member 56 is supported by the other of the parallel linkage members 58, the fixing portion of which is fixed to the base member 60. They are formed integral together with the locking mechanism.

Since the parallel linkage members 54, 58, in which the link parts and the flexible parts are made of the common thin resilient plates, support the correcting lens movably without increasing the mass of the driven member, the response of servo control is improved.

Moreover, since the parallel linkage members 54, 58 have no play, no frictional loss, and small load in use because of the resilient characteristics of the thin resilient plate, the response character is improved.

Although the mechanical strength of the parallel linkage members 54, 58 is not high, they are unitized together with the other members and the locking mechanism as the image shake preventing mechanism. Thereby, it is easy to deal with it and to install it into the apparatus.

Arrangement that the parallel linkage members surround the correcting lenses makes the image shake preventing member compact.

In the binoculars 10, a pair of the correcting lenses 51 can move in parallel with each other without backward play.

Although the present invention has been fully described in connection with the preferred embodiment thereof with reference to the accompanying drawings, it is to be noted that various changes and modifications are also apparent to those skilled in the art.

Figure 16:
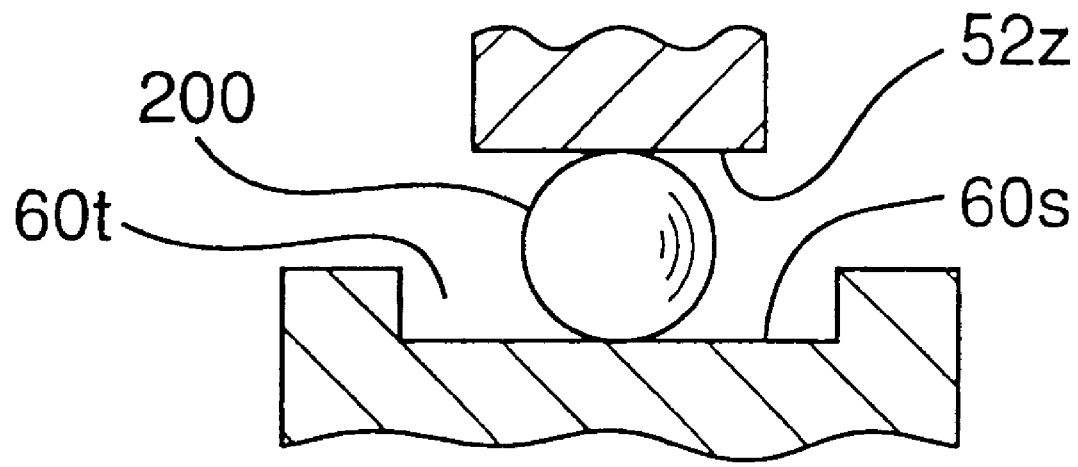
FIG. 16 is a schematic illustration of a parallel linkage member after transforming.

For example, instead of the construction in which the standard projections 52*z* of the holding member 52 contact the standard surfaces 60*s* of the base member 60 directly, balls 200 may be disposed therebetween, as shown in FIG. 16. In that construction, preferably, the base member 60 has recesses 60*t* so as to prevent the balls 200 from slipping out thereof, and bottom surfaces 60*s* thereof are used as standard surface. The friction between the standard projections 52*z* and the standard surfaces 60*s* can be reduced, while they are kept parallel to each other with accuracy. Since only a little force can drive the holding member 52 in a direction parallel to the base member 60 smoothly, there are effects of correcting an image shake fast, reducing the power dissipation, and so on.

The image shake preventing mechanism 50 and/or the drive units 100a–100d can be applied to not only the binoculars 10, but any other of the optical apparatus. For example, they can be applied to an imaging apparatus such as a camera, in which the correcting lens, or an image taking sensor disposed at an image forming position is driven according to the deviation of an image forming position.

In the image shake preventing mechanism or the optical device provided with such a mechanism, a pair of the flexible parts adjacent to at least one of the link parts of at least one of the first parallel linkage member and the second parallel linkage member may be formed with a thin resilient plate. The pair of the flexible parts may extend in a direction parallel to the optical axis of the driven member.

In the embodiment, when the pair of flexible parts bend in a direction perpendicular to the optical axis of the driven member, link parts adjacent to the pair of the flexible parts rotate and a link part opposing the pair of the flexible parts moves. It is easy to make the parallel linkage member, or the image shake preventing mechanism or the optical device provided with such a mechanism, compact. Resilience of the thin plate can reduce or eliminate play and frictional loss. Less load in use can improve the response characteristic.

The flexible parts adjacent to at least a pair of the link parts of at least one of the first parallel linkage member and the second parallel linkage member, and the at least a pair of the link parts thereof may be formed with a thin resilient plate. The flexible parts may extend in a direction parallel to the optical axis of the driven member.

In the embodiment, as the same thin plate is used for the flexible parts and the pair of the link parts, it is possible to move one of the link parts in both direction with equal load or equal resistance of the flexible parts. Thus, the parallel linkage member can be balanced with respect to the load difference between moving directions.

A pair of the flexible parts adjacent to at least one of the link parts of at least one of the first parallel linkage member and the second parallel linkage member, and at least a part of the at least one of the link parts thereof may be formed with a thin resilient plate. The pair of the flexible parts may extend in a direction parallel to the optical axis of the driven member. The at least a part of the at least one of the link parts thereof may be folded.

In the embodiment, folded link parts can be more rigid than the flexible parts. Thus, it is easy to construct at least a part of the parallel linkage member with the thin plate.

The first parallel linkage member and the second parallel linkage member may be formed with a thin resilient plate respectively. The first parallel linkage member and the second parallel linkage member may be spaced in a direction of the optical axis of the driven member.

In the embodiment, the first parallel linkage member and the second parallel linkage member can be overlapped without expanding in a direction perpendicular to the optical axis of the driven member. Thus, it is possible to make the image shake preventing mechanism and the optical device provided with such a mechanism compact.

The holding member may have a surface extending perpendicular to the optical axis of the driven member. The base member may have a standard surface opposed to the surface of the holding member. A spring is connected to the holding member and the base member to urge the surface of the holding member toward the standard surface of the base member.

In the embodiment, when the surface of the holding member is contacted under pressure with the standard surface of the base member by the spring, the driven member can move relative to the base member with great accuracy. Even if there is a space between the surface of the holding member and the standard surface of the base member, the driven member can move relative to the base member with great accuracy so as to keep the space constant by any suitable construction.

In the embodiment, it is preferred to further comprise spacing members having a globular form. The spacing members are held between the surface of the holding member and the standard surface of the base member.

Thereby, the spacing members can maintain the space between the surface of the holding member and the standard surface of the base member constant, and the driven member can move relative to the base member with great accuracy. Moreover, as the spacing members reduce the frictional resistance, it is possible to move the driven member smoothly and fast with small driving force.

The image shake preventing mechanism further comprises a mechanical locking system for locking the holding member in a predetermined position relative to the base member releasably.

In the embodiment, when the mechanical locking system locks the holding member, the driven member is fixed relative to the base member. Thus, the image shake preventing mechanism can perform selectively by the mechanical locking system.

In the embodiment, preferably, the mechanical locking system comprises: a guide rod extending from the base member in a direction parallel to the optical axis of the driven member; a locking pin slidably engaging the guide rod, and having a tapered surface tapered in a direction along the guide rod; an opposite surface formed on the holding member, and opposing to the tapered surface of the locking pin; a spring for urging the locking pin into position for locking engagement of the tapered surface thereof with the opposite surface of the holding member; and a release member for releasing the locking pin from engagement of the tapered surface thereof with the opposite surface of the holding member.

In the construction, when the tapered surface of the locking pin is engaged with the opposite surface of the holding member under the urging of the spring, the holding member is held to the base member and locked. When the release member removes the locking pin, the holding member is unlocked.

In the construction, preferably, the holding member has a guide hole fitting with a clearance about the guide rod, so that the guide hole limits the motion of the holding member relative to the base member. The release member removes the locking pin from engagement of the tapered surface thereof with the opposite surface of the holding member, when the release member releases the locking pin from engagement of the tapered surface thereof with the opposite surface of the holding member.

In the construction, the guide hole limits the motion of the holding member relative to the base member. Thus, even if correction of the image shake in a direction causes accumulative motion of the driven member, the driven member is prevented from moving beyond a predetermined range.

There may be a plurality of driven members each of which is the driven member. The holding member may be an integral member which holds the plurality of the driven members.

In the case that the driven members need to be driven in the same direction with the same distance at the same time, the construction can be simple.

In the embodiment, the driven member may be, for example, a lens included in an optical system, or an image taking sensor disposed at an image forming position.

In the case that the driven member is a lens included in an optical system, the driven member can be moved so as to correct or compensate deviation of an image forming position which is caused by a shake or a movement of a body provided with the image shake preventing mechanism. In the case that the driven member is an image taking sensor disposed at an image forming position, the driven member can be moved so as to correct or compensate a deviation of an image forming position which is caused by a shake or a movement of a body provided with the image shake preventing mechanism.

What is claimed is:

1. An image shake preventing mechanism, comprising:
    a driven member to be driven so as to prevent the image shake;
    a holding member for holding the driven member;
    a first parallel linkage member arranged perpendicular to an optical axis of the driven member, the first parallel linkage member having link parts arranged in a form of parallelogram and connected with each other by flexible parts so that the first parallel linkage member can be deformed into any other form of parallelogram in a plane perpendicular to the optical axis of the driven member, one of the link parts being fixed to the holding member;
    an intermediate member fixed to another of the link parts of the first parallel linkage member parallel to the one thereof;
    a second parallel linkage member overlapped with the first parallel linkage member in parallel relation thereto, the second parallel linkage member having link parts arranged in a form of parallelogram and connected with each other by flexible parts so that the second parallel linkage member can be deformed into any other form of parallelogram in a plane perpendicular to the optical axis of the driven member , one of the link parts being fixed to the intermediate member; and
    a base member fixed to another of the link parts of the second parallel linkage member parallel to the one thereof, wherein the one of the link parts of the first parallel linkage member is generally perpendicular to the one of the link parts of the second parallel linkage member.

2. The image shake preventing mechanism as claimed in claim 1, wherein a pair of the flexible parts adjacent to at least one of the link parts of at least one of the first parallel linkage member and the second parallel linkage member are formed with a thin resilient plate, and wherein the pair of the flexible parts extend in a direction parallel to the optical axis of the driven member.

3. The image shake preventing mechanism as claimed in claim 1, wherein the flexible parts adjacent to at least a pair of the link parts of at least one of the first parallel linkage member and the second parallel linkage member, and the at least a pair of the link parts thereof are formed with a thin resilient plate, and wherein the flexible parts extend in a direction parallel to the optical axis of the driven member.

4. The image shake preventing mechanism as claimed in claim 1, wherein a pair of the flexible parts adjacent to at least one of the link parts of at least one of the first parallel linkage member and the second parallel linkage member, and at least a part of the at least one of the link parts thereof are formed with a thin resilient plate, wherein the pair of the flexible parts extend in a direction parallel to the optical axis of the driven member, and wherein the at least a part of the at least one of the link parts thereof is folded.

5. The image shake preventing mechanism as claimed in claim 1, wherein the first parallel linkage member and the second parallel linkage member are formed with a thin resilient plate respectively, and wherein the first parallel linkage member and the second parallel linkage member are spaced in a direction of the optical axis of the driven member.

6. The image shake preventing mechanism as claimed in claim 1, wherein the holding member has a surface extending perpendicular to the optical axis of the driven member, wherein the base member has a standard surface opposed to the surface of the holding member, and wherein a spring is connected to the holding member and the base member so as to urge the surface of the holding member toward the standard surface of the base member.

7. The image shake preventing mechanism as claimed in claim 6, which further comprises spacing members having a globular form, wherein the spacing members are held between the surface of the holding member and the standard surface of the base member.

8. The image shake preventing mechanism as claimed in claim 1, which further comprises a mechanical locking system for locking the holding member in a predetermined position relative to the base member releasably.

9. The image shake preventing mechanism as claimed in claim 8, wherein the mechanical locking system comprises:
    a guide rod extending from the base member in a direction parallel to the optical axis of the driven member;
    a locking pin slidably engaging the guide rod, and having a tapered surface tapered in a direction along the guide rod;
    an opposite surface formed on the holding member, and opposing to the tapered surface of the locking pin;
    a spring for urging the locking pin into position for locking engagement of the tapered surface thereof with the opposite surface of the holding member; and
    a release member for releasing the locking pin from engagement of the tapered surface thereof with the opposite surface of the holding member.

10. The image shake preventing mechanism as claimed in claim 9, wherein the holding member has a guide hole fitting with a clearance about the guide rod, so that the guide hole limits the motion of the holding member relative to the base member, when the release member releases the locking pin from engagement of the tapered surface thereof with the opposite surface of the holding member.

11. The image shake preventing mechanism as claimed in claim 1, wherein there are a plurality of driven members each of which is the driven member, and wherein the holding member is an integral member which holds the plurality of the driven members.

12. The image shake preventing mechanism as claimed in claim 1, wherein the driven member is one of a lens included in an optical system and an image taking sensor disposed at an image forming position.

13. An optical device, comprising:
    a driven member to be driven so as to prevent the image shake;
    a holding member for holding the driven member;
    a first parallel linkage member arranged perpendicular to an optical axis of the driven member, the first parallel linkage member having link parts arranged in a form of parallelogram and connected with each other by flexible parts so that the first parallel linkage member can be deformed into any other form of parallelogram in a plane perpendicular to the optical axis of the driven member, one of the link parts being fixed to the holding member;

an intermediate member fixed to another of the link parts of the first parallel linkage member parallel to the one thereof;

a second parallel linkage member overlapped with the first parallel linkage member in parallel relation thereto, the second parallel linkage member having link parts arranged in a form of parallelogram and connected with each other by flexible parts so that the second parallel linkage member can be deformed into any other form of parallelogram in a plane perpendicular to the optical axis of the driven member , one of the link parts being fixed to the intermediate member; and a base member fixed to another of the link parts of the second parallel linkage member parallel to the one thereof, wherein the one of the link parts of the first parallel linkage member is generally perpendicular to the one of the link parts of the second parallel linkage member.

14. The optical device as claimed in claim 13, wherein a pair of the flexible parts adjacent to at least one of the link parts of at least one of the first parallel linkage member and the second parallel linkage member are formed with a thin resilient plate, and wherein the pair of the flexible parts extend in a direction parallel to the optical axis of the driven member.

15. The optical device as claimed in claim 13, wherein the flexible parts adjacent to at least a pair of the link parts of at least one of the first parallel linkage member and the second parallel linkage member, and the at least a pair of the link parts thereof are formed with a thin resilient plate, and wherein the flexible parts extend in a direction parallel to the optical axis of the driven member.

16. The optical device as claimed in claim 13, wherein a pair of the flexible parts adjacent to at least one of the link parts of at least one of the first parallel linkage member and the second parallel linkage member, and at least a part of the at least one of the link parts thereof are formed with a thin resilient plate, wherein the pair of the flexible parts extend in a direction parallel to the optical axis of the driven member, and wherein the at least a part of the at least one of the link parts thereof is folded.

17. The optical device as claimed in claim 13, wherein the first parallel linkage member and the second parallel linkage member are formed with a thin resilient plate respectively, and wherein the first parallel linkage member and the second parallel linkage member are spaced in a direction of the optical axis of the driven member.

18. The optical device as claimed in claim 13, wherein the holding member has a surface extending perpendicular to the optical axis of the driven member, wherein the base member has a standard surface opposed to the surface of the holding member, and wherein a spring is connected to the holding member and the base member so as to urge the surface of the holding member toward the standard surface of the base member.

19. The optical device as claimed in claim 18, which further comprises spacing members having a globular form, wherein the spacing members are held between the surface of the holding member and the standard surface of the base member.

20. The optical device as claimed in claim 13, which further comprises a mechanical locking system for locking the holding member in a predetermined position relative to the base member releasably.

21. The optical device as claimed in claim 20, wherein the mechanical locking system comprises;

a guide rod extending from the base member in a direction parallel to the optical axis of the driven member;

a locking pin slidably engaging the guide rod, and having a tapered surface tapered in a direction along the guide rod;

an opposite surface formed on the holding member, and opposing to the tapered surface of the locking pin;

a spring for urging the locking pin into position for locking engagement of the tapered surface thereof with the opposite surface of the holding member; and a release member for releasing the locking pin from engagement of the tapered surface thereof with the opposite surface of the holding member.

22. The optical device as claimed in claim 21, wherein the holding member has a guide hole fitting with a clearance about the guide rod, so that the guide hole limits the motion of the holding member relative to the base member, when the release member releases the locking pin from engagement of the tapered surface thereof with the opposite surface of the holding member.

23. The optical device as claimed in claim 13, wherein there are a plurality of driven members each of which is the driven member, and wherein the holding member is an integral member which holds the plurality of the driven members.

24. The optical device as claimed in claim 13, wherein the driven member is one of a lens included in an optical system and an image taking sensor disposed at an image forming position.

* * * * *